United States Patent
Mihara et al.

(10) Patent No.: US 9,981,546 B2
(45) Date of Patent: May 29, 2018

(54) VALVE DEVICE FOR FUEL TANK

(71) Applicants: PIOLAX, INC., Yokohama-shi (JP); YACHIYO INDUSTRY CO., LTD., Sayama-shi (JP)

(72) Inventors: Kenta Mihara, Yokohama (JP); Kazunari Nakaya, Sakura (JP); Masato Shinozaki, Sakura (JP); Masaru Sawano, Sakura (JP)

(73) Assignees: PIOLAX, INC., Yokohama-Shi, Kanagawa (JP); YACHIYO INDUSTRY CO., LTD., Sayama-Shi, Saitama (JP)

( * ) Notice: Subject to any disclaimer, the term of this patent is extended or adjusted under 35 U.S.C. 154(b) by 0 days. days.

(21) Appl. No.: 15/123,279

(22) PCT Filed: Dec. 18, 2014

(86) PCT No.: PCT/JP2014/083529
§ 371 (c)(1),
(2) Date: Sep. 2, 2016

(87) PCT Pub. No.: WO2015/133039
PCT Pub. Date: Sep. 11, 2015

(65) Prior Publication Data
US 2017/0072787 A1 Mar. 16, 2017

(30) Foreign Application Priority Data
Mar. 5, 2014 (JP) .................................. 2014-042602

(51) Int. Cl.
*F16K 31/18* (2006.01)
*B60K 15/035* (2006.01)
(Continued)

(52) U.S. Cl.
CPC ....... *B60K 15/035* (2013.01); *F02M 25/0836* (2013.01); *F16K 24/044* (2013.01);
(Continued)

(58) Field of Classification Search
CPC ............ B60K 15/035; B60K 15/03504; B60K 15/03519; B60K 15/03289;
(Continued)

(56) References Cited

U.S. PATENT DOCUMENTS 6,675,779 B2 * 1/2004 King ...................... F02M 37/20
123/518
7,163,023 B2 * 1/2007 Spink .................... F16K 24/044
137/15.26

(Continued)

FOREIGN PATENT DOCUMENTS

JP H06-297968 A 10/1994
JP 2006-177164 A 7/2006
(Continued)

OTHER PUBLICATIONS

International Search Report (ISR) (PCT Form PCT/ISA/210), in PCT/JP2014/083529, dated Mar. 31, 2015.

Primary Examiner — Craig J Price
(74) Attorney, Agent, or Firm — McGinn IP Law Group, PLLC

(57) ABSTRACT

A fuel tank valve device includes a housing in which a partition wall defines a lower valve chamber and an upper ventilation chamber, and a first opening and a second opening are provided to establish a communication between the lower valve chamber and the upper ventilation chamber, a first float valve that is accommodated in a first valve chamber of the lower valve chamber so as to rise and fall and that closes the first opening when a fuel level in a fuel tank nearly reaches a set full fuel level, and a second float valve (Continued)

that is accommodated in a second valve chamber of the lower valve chamber so as to rise and fall and that closes the second opening when the fuel level in the fuel tank rises abnormally.

15 Claims, 30 Drawing Sheets

(51) Int. Cl.
  *F16K 24/04* (2006.01)
  *F02M 25/08* (2006.01)
  *B60K 15/03* (2006.01)

(52) U.S. Cl.
  CPC ............... *B60K 2015/03289* (2013.01); *B60K 2015/03571* (2013.01); *Y10T 137/741* (2015.04); *Y10T 137/7404* (2015.04)

(58) Field of Classification Search
  CPC . B60K 2015/03289; B60K 2015/03571; F16L 47/02; F16L 47/14; F02M 37/017; F02M 37/0076; F02M 25/0836; F16K 24/04; F16K 24/06; F16K 27/07; F16K 11/074; F16K 24/044; Y10T 137/0874; Y10T 137/3099; Y10T 137/741; Y10T 137/7404; G05D 16/04
  USPC .......................................... 137/423, 424, 425
  See application file for complete search history.

(56) References Cited

U.S. PATENT DOCUMENTS

| | | | |
|---|---|---|---|
| 7,913,671 B2 * | 3/2011 | Arnalsteen | ....... B60K 15/03519 123/516 |
| 8,371,326 B2 * | 2/2013 | Mills | ........................ F16K 17/19 137/202 |
| 8,689,816 B2 * | 4/2014 | Pifer | ..................... F16K 24/044 123/518 |
| 9,360,872 B2 * | 6/2016 | Pifer | ..................... F16K 24/044 |
| 2013/0025700 A1 | 1/2013 | Kito et al. | |
| 2014/0091567 A1 | 4/2014 | Honda et al. | |

FOREIGN PATENT DOCUMENTS

| | | |
|---|---|---|
| JP | 2013-028213 A | 2/2013 |
| JP | 2015-020546 A | 2/2015 |
| WO | WO 2012/137774 A1 | 10/2012 |

\* cited by examiner

VALVE DEVICE FOR FUEL TANK

TECHNICAL FIELD

The present invention relates to a fuel tank valve device that is mounted in a fuel tank of a vehicle or the like to prevent fuel from flowing out of the fuel tank.

BACKGROUND ART

A valve device is mounted in a fuel tank of a vehicle. The valve device prevents fuel in the fuel tank from leaking out when the vehicle turns sharply or is inclined. In addition, the valve device prevents excessive feeding of fuel into the fuel tank such that the fuel level in the fuel tank does not exceed a predetermined full fuel level.

For example, Patent Literature 1 describes a fuel tank evaporative emission control system. The fuel tank evaporative emission control system has: a casing having an end plate having a first and second openings and in which a lower space and an upper space are defined via the end plate; a straight fuel vapor discharge pipe that is connected to an upper portion of the casing so as to communicate with the upper space; a first float valve that is disposed in the lower space so as to rise and fall and closes the first opening when a fuel level in a fuel tank nearly reaches a full fuel level; a second float valve that is disposed in the lower space so as to rise and fall and closes the second opening when the fuel level in the fuel tank rises abnormally; and a relief valve that is disposed to an upper portion of the second opening and closes normally the second opening, and opens the second opening when an internal pressure in the fuel tank becomes equal to or higher than a predetermined value.

When the fuel level nearly reaches the full fuel level as a result of feeding fuel into the fuel tank, the first float valve closes the first opening. Thus, further feeding of fuel is restricted. On the other hand, when fuel oscillates in the fuel tank, the first float valve and the second float valve rise to thereby respectively close the first opening and the second opening. Thus, fuel is prevented from flowing into the fuel vapor discharge pipe, and fuel is prevented from flowing out of the fuel tank.

CITATION LIST

Patent Literature

Patent Literature 1
JP-H06-297968-A

SUMMARY OF THE INVENTION

Problem that the Invention is to Solve

In the case of the fuel tank valve device described in Patent Literature 1, when the internal pressure in the fuel tank is increased by fuel vapors produced in the fuel tank as the vehicle is driven, the fuel vapors flow into the upper space in the casing through the first opening to be discharged from the fuel vapor discharge pipe.

Additionally, the second opening to be abutted by the second float valve is closed normally by the relief valve that is biased by the spring. However, when fuel oscillates violently or a lot of splashing of fuel is produced in the fuel tank by vibrations generated as the vehicle is driven, the fuel forcibly lifts up the relief valve against the biasing force of the spring to enter the upper space through the second opening, resulting in fears that fuel in the form of liquid flows into a discharge port of the fuel vapor discharge pipe.

An object of the invention is to provide a fuel tank valve device that can discharge fuel vapors produced within a fuel tank and which restrains fuel having entered an interior of a ventilation chamber from entering a fuel vapor discharge port.

Means for Solving the Problem

To achieving the above-described object, the invention provides
a fuel tank valve device including:
a housing in which a partition wall defines a lower valve chamber and an upper ventilation chamber and a first opening and a second opening are provided in the partition wall so as to establish a communication between the valve chamber and the ventilation chamber;
a first float valve that is accommodated in the valve chamber so as to rise and fall and that closes the first opening when a fuel level in a fuel tank nearly reaches a set full fuel level;
a second float valve that is accommodated in the valve chamber so as to rise and fall and that closes the second opening when the fuel level in the fuel tank rises abnormally;
a recess portion in which the first opening of the housing is formed at a bottom portion thereof and which makes up part of the ventilation chamber; and
a fuel vapor discharge port that is formed so as to communicate with the ventilation chamber,
wherein the partition wall includes a shelf wall portion that extends from a circumferential edge of the second opening to reach an inner circumference of the recess portion,
wherein a first groove portion is formed on the shelf wall portion so as to extend from the second opening to the recess portion, and
wherein a ceiling wall that makes up a ceiling of the ventilation chamber is disposed above the shelf wall portion via a gap.

There may be provided the fuel tank valve device,
wherein a third opening that makes up the fuel vapor discharge port is provided on the shelf wall portion at a position that lies spaced away from the recess portion when the housing is seen from thereabove.

There may be provided the fuel tank valve device,
wherein the first opening, the second opening and the third opening are disposed respectively at apexes of a triangle when the housing is seen from thereabove.

There may be provided the fuel tank valve device,
wherein a line that connects the first opening and the third opening and a line that connects the second opening and the third opening form an acute angle when the housing is seen from thereabove.

There may be provided the fuel tank valve device,
wherein a second groove portion is formed on the partition wall so as to extend to establish a communication between the recess portion and the third opening.

There may be provided the fuel tank valve device,
wherein an eave wall portion is formed on an end portion of the second groove portion at a side of the recess portion so as to project radially inwards of the recess portion.

There may be provided the fuel tank valve device,
wherein vertical ribs are provided at longitudinal ends of the eave wall portion so as to project radially inwards of the recess portion.

There may be provided the fuel tank valve device, wherein the fuel vapor discharge port is formed on an inner circumference of the recess portion at a different circumferential position from a circumferential position of the first groove portion.

There may be provided the fuel tank valve device, wherein there is further provided a fuel vapor piping that communicates with the fuel vapor discharge port and which is connected to the housing at an acute angle relative to a path extending from the second opening to the first opening, and wherein a bypass flow path is provided in the housing so as to be opened in the shelf wall portion to thereby communicate with the gap at one end and to be opened in the inner circumference of the fuel vapor piping to thereby communicate with the fuel vapor piping at the other end thereof.

There may be provided the fuel tank valve device, wherein the fuel vapor piping is provided so that at least part thereof passes below the shelf wall portion of the partition wall.

There may be provided the fuel tank valve device, wherein the bypass flow path extends downwards in a perpendicular direction from an upper surface of the shelf wall portion of the partition wall to communicate with the inner circumference of the fuel vapor piping at a lower end thereof.

There may be provided the fuel tank valve device, wherein a rib is formed on an inner surface of the ceiling wall so as not only to pass between the first groove portion and the bypass flow path but also to extend in a direction of moving away from the fuel vapor discharge port.

There may be provided the fuel tank valve device, wherein a depth of the first groove portion from an upper surface of the shelf wall portion is greater than a height of the gap defined between the shelf wall portion and the ceiling wall.

There may be provided the fuel tank valve device, wherein an area of the first groove portion when it is cut along a plane that is perpendicular to an extending direction of the first groove portion is greater than an area of the second opening.

There may be provided the fuel tank valve device, wherein the housing includes a main body portion in which the valve chamber, the ventilation chamber, the partition wall, the recess portion and the fuel vapor discharge port are provided, and wherein the ceiling wall as a separate member is mounted on the main body portion.

Advantageous Effects of Invention

According to the fuel tank valve device of the invention, when fuel in the fuel tank oscillates to eventually flow into the ventilation chamber from the second opening, the fuel flows intensively into the first groove portion that is formed on the shelf wall portion of the partition wall to thereby fall into the recess portion. Therefore, the fuel can easily be returned to the fuel tank through the first opening that is formed in a bottom portion of the recess portion, while the fuel is restrained from flowing into the fuel vapor discharge port, whereby the fuel can be restrained from flowing into the fuel vapor piping that communicates with a canister or the like.

On the other hand, when fuel vapors in the fuel tank flow into the ventilation chamber through the second opening, the fuel vapors then flow into the recess portion through the first groove portion or the gap defined between the shelf wall portion and the ceiling wall to eventually flow into the fuel vapor discharge port that is formed in the inner circumference of the recess portion. Thus, the fuel vapors can be discharged outside from the fuel vapor piping.

MODE FOR CARRYING OUT THE INVENTION

Hereinafter, an embodiment of a fuel tank valve device of the invention will be described by reference to FIGS. 1 to 12.

Figure 1:
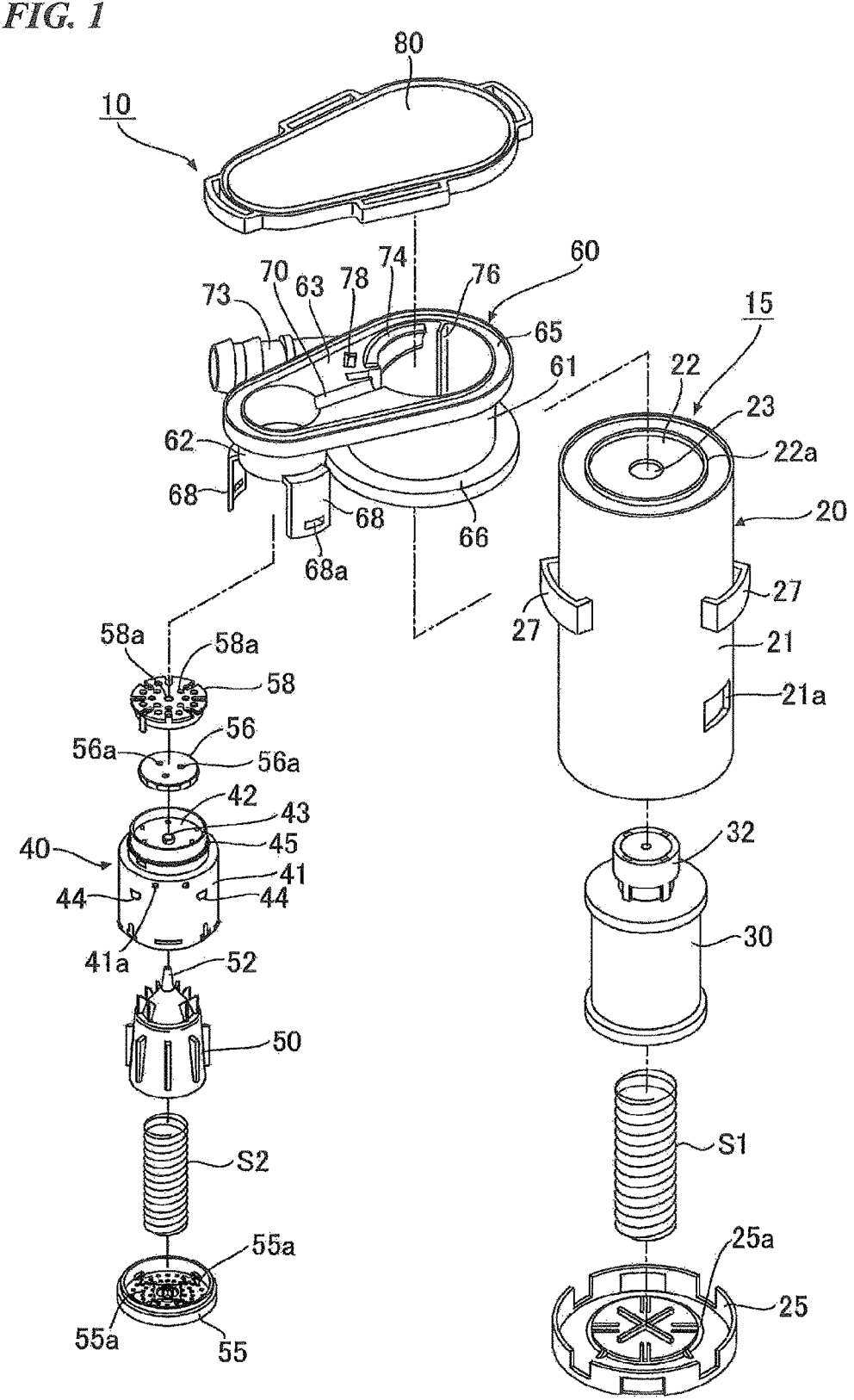
FIG. 1 is an exploded perspective view of a fuel tank valve device according to one embodiment of the invention.
Figure 2:
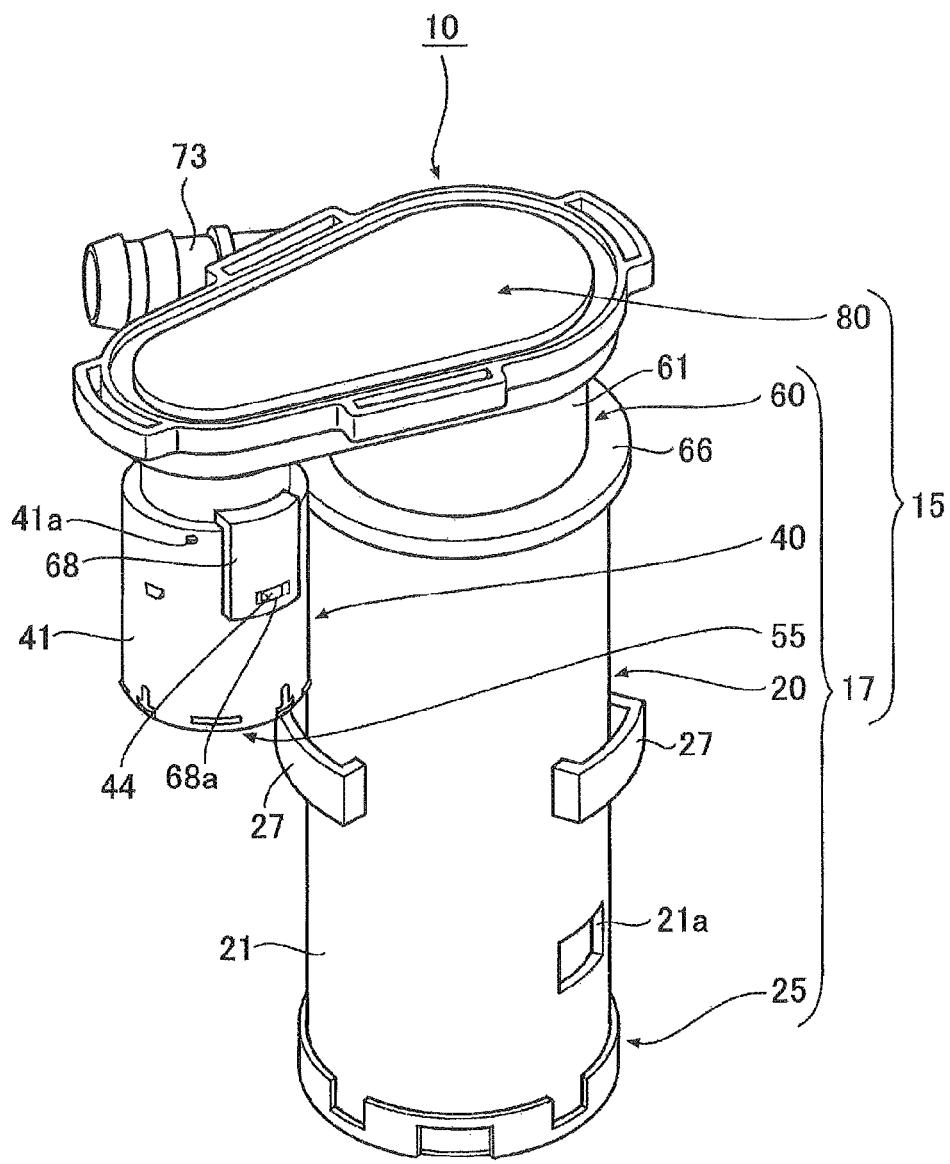
FIG. 2 is a perspective view of the valve device.

As shown in FIGS. 1, 2, a fuel tank valve device 10 (valve device 10) has a housing 15 that is made up of a main body portion 17 (refer to FIG. 2) and a separate ceiling wall 80 that is mounted on the main body portion 17. The main body portion 17 has a first casing 20 that accommodates a first float valve 30 and a first cap 25 that is mounted at a bottom of the first casing 20, a second casing 40 that accommodates a second float valve 50 and a second cap 55 that is mounted at a bottom of the second casing 40, and a cover 60 that is mounted on the first casing 20 and the second casing 40 so as to connect both the first casing 20 and the second casing 40 together.

Firstly, the first casing 20, the second casing 40, and the first float valve 30 and the second float valve 50 that are accommodated in the first casing 20 and the second casing 40, respectively, will be described.

The first casing 20 has a cylindrical circumferential wall 21 that is opened at a bottom thereof. A first partition wall 22 in which a first opening 23 is formed is provided at a top of the first casing 20. An annular wall 22a is provided on an upper surface of the first partition wall 22 along an outer circumference of the first opening 23 so as to project upwards therefrom. Plural mounting brackets 27 are provided at predetermined locations on an outer circumference of the circumferential wall 21 of the first casing 20. Locking pieces, not shown, which are provided on a fuel tank are brought into engagement with the corresponding mounting brackets 27, whereby the first casing 20 is mounted inside a fuel tank 1 (refer to FIGS. 10 to 12). A through hole 21a is formed in the circumferential wall 21 of the first casing 20.

The first cap 25 is mounted on a lower opening portion of the first casing 20, whereby a first valve chamber V1 where the first float valve 30 is accommodated is defined below the first partition wall 22 (refer to FIG. 10). A through hole 25a is formed in a bottom surface of the first cap 25. The first valve chamber V1 is allowed to communicate with a fuel tank interior via the through hole 25a and the through 21a.

The first float valve 30 is accommodated in the first valve chamber V1 so as to rise and fall with a first spring S1 interposed between the first cap 25 and the first float valve 30. A valve head 32, which can oscillate, is mounted on the first float valve 30 (refer to FIG. 10).

The second casing 40 has a cylindrical circumferential wall 41 that is made diametrically wider at a lower portion while being made diametrically narrower than the lower portion at an upper portion. A seal ring 45 is mounted on an outer circumference of the diametrically narrowed upper portion of the second casing 40.

A second partition wall 42 in which a second opening 43 is formed is provided at a top of the second casing 40. As shown in FIG. 10, the second partition wall 42 is formed in a higher position than the first partition wall 22. The second casing 40 is smaller in diameter and shorter in length than the first casing 20. The second opening 43 has a portion that projects into a cylindrical shape from an upper surface of the second partition wall 42. A notch, not shown, is formed in this projecting portion, so that the second opening 43 is not closed completely in such a state that a check valve 56, which will be described later, is brought into abutment with the projecting portion (refer to FIGS. 10 and 11).

The second cap 55 is mounted on a lower opening portion of the second casing 40, whereby a second valve chamber V2 where the second float valve 50 is accommodated is defined below the second partition wall 42 (refer to FIG. 10). Through holes 55a are formed in a bottom surface of the second cap 55. Plural engaging claws 44 are provided on an outer circumference of the circumferential wall 41 of the second casing 40 so as to project therefrom. A through hole 41a communicating with the second valve chamber V2 is formed in the circumferential wall 41.

The second float valve 50 is accommodated in the second valve chamber V2 so as to rise and fall with a second spring S2 interposed between the second cap 55 and the second float valve 50. A valve head S2 is provided on the second float valve 50.

Figure 10:
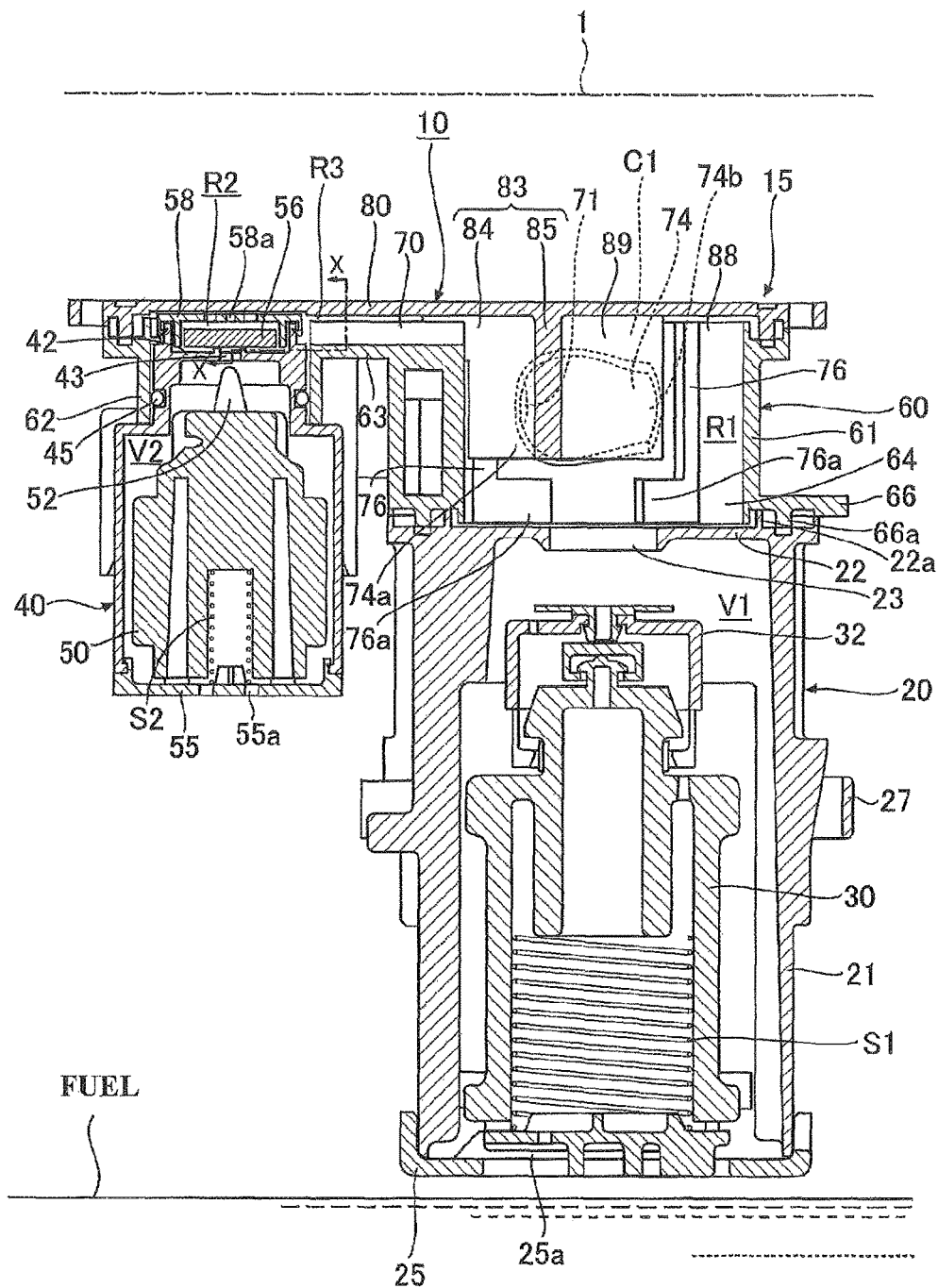
FIG. 10 is a sectional view of the valve device in which a first float valve and a second float valve are in a lowered state.

As shown in FIG. 10, in such a state that the first float valve 30 or the second float valve 50 is not submerged in fuel having entered the corresponding valve chamber V1 or V2, the first float valve 30 or the second float valve 50 compresses the corresponding spring S1 or S2 by its own weight to rest on the corresponding cap 25 or 55, whereby the first opening 23 or the second opening 43 is kept open.

In the following description, "fuel" means liquid fuel (including splashes of fuel), and "fuel vapor" means evaporated fuel.

Figure 11:
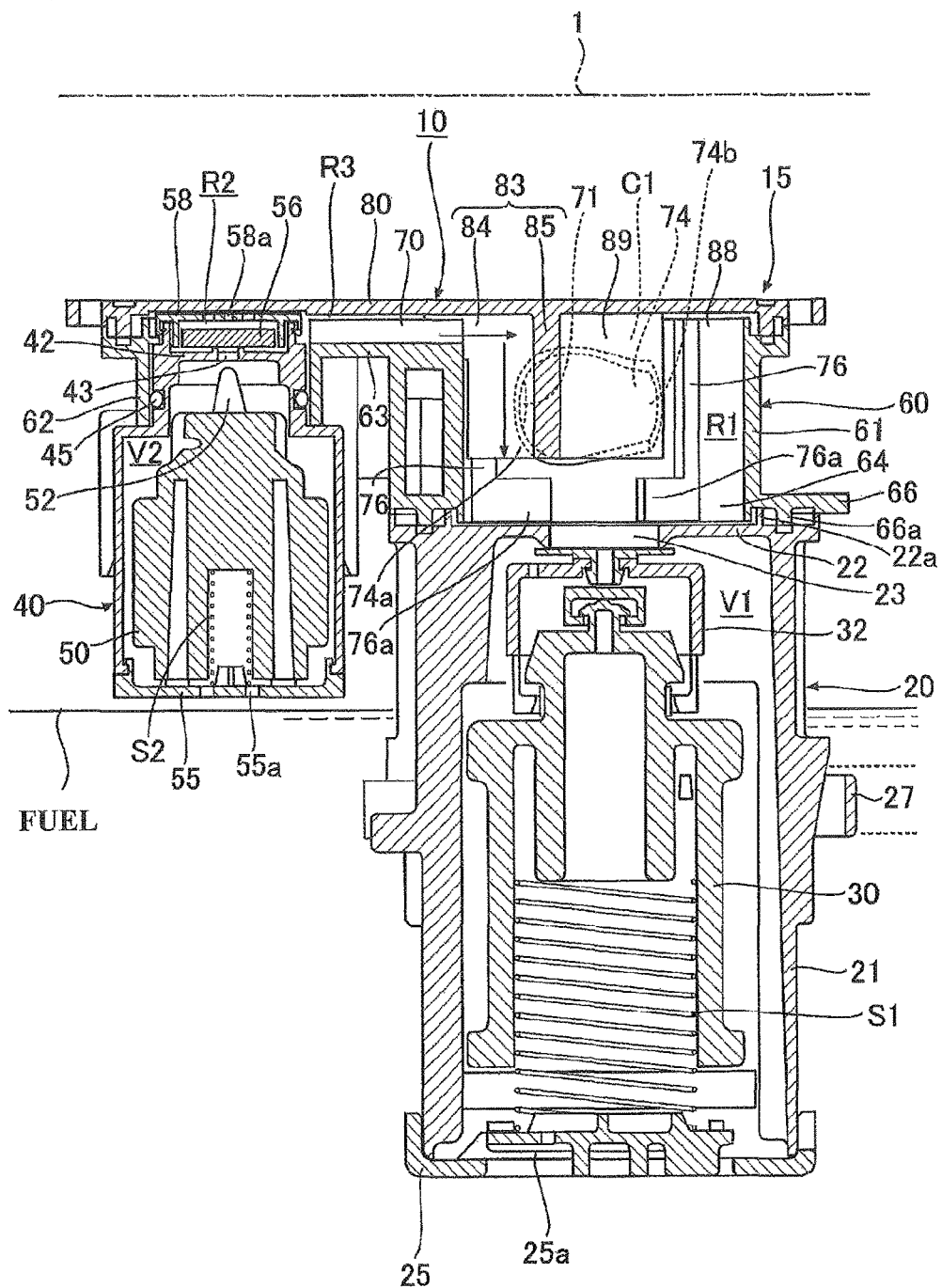
FIG. 11 is a sectional view of the valve device in which the first float valve is in a raised state.

In the above-described state, when a fuel level in the fuel tank rises whereby the float valves 30, 50 are submerged in fuel, the float valves 30, 50 are caused to rise by the biasing forces of the springs S1, S2 and the buoyancies of the float valves 30, 50 themselves (refer to FIGS. 10 and 11).

When the fuel level in the fuel tank reaches a set full fuel level, the first float valve 30 closes the first opening 23 and functions as an excessive-feeding prevention valve to prevent further feeding of fuel. When the fuel level in the fuel tank rises abnormally due to oscillation of fuel in the fuel tank, the second float valve 50 closes the second opening 43 and functions as a fuel overflow prevention valve that prevents the leakage of fuel to the outside.

A lid member 58 having plural through holes 58a is mounted on the diametrically narrowed upper portion of the circumferential wall 41 of the second casing 40. The check valve 56 having a circular disc shape and having plural through holes 56a is accommodated inwards of the lid member 58 and on the second partition wall 42.

In such a state that the first opening 23 is closed by the first float valve 30, when the internal pressure of the fuel tank is lowered, the check valve 56 allows air to be introduced into the fuel tank through the through holes 58a of the lid member 58, the through holes 56a of the check valve 56 and the notch, not shown, of the second opening 43, while when the internal pressure of the fuel tank is raised, the check valve 56 rises to open the second opening 43, whereby fuel vapors are discharged out of the fuel tank.

Next, the cover 60 that is mounted on the first casing 20 and the second casing 40 to connect them together into one unit and the ceiling wall 80 that is mounted on the cover 60 will be described.

Figure 3A:
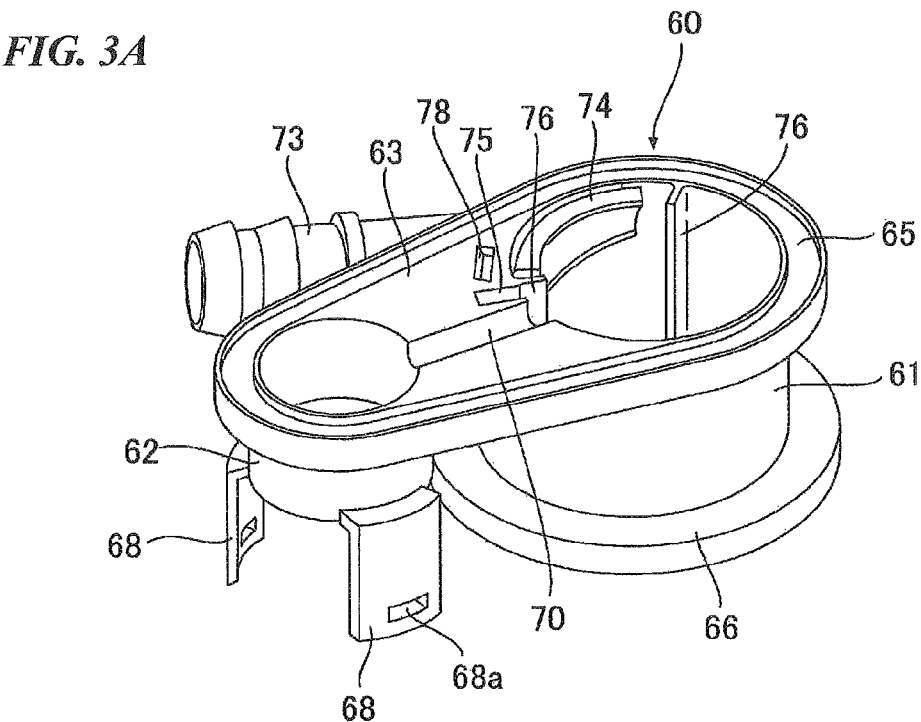
FIG. 3A is a perspective view of a cover that makes up the valve device.
Figure 3B:
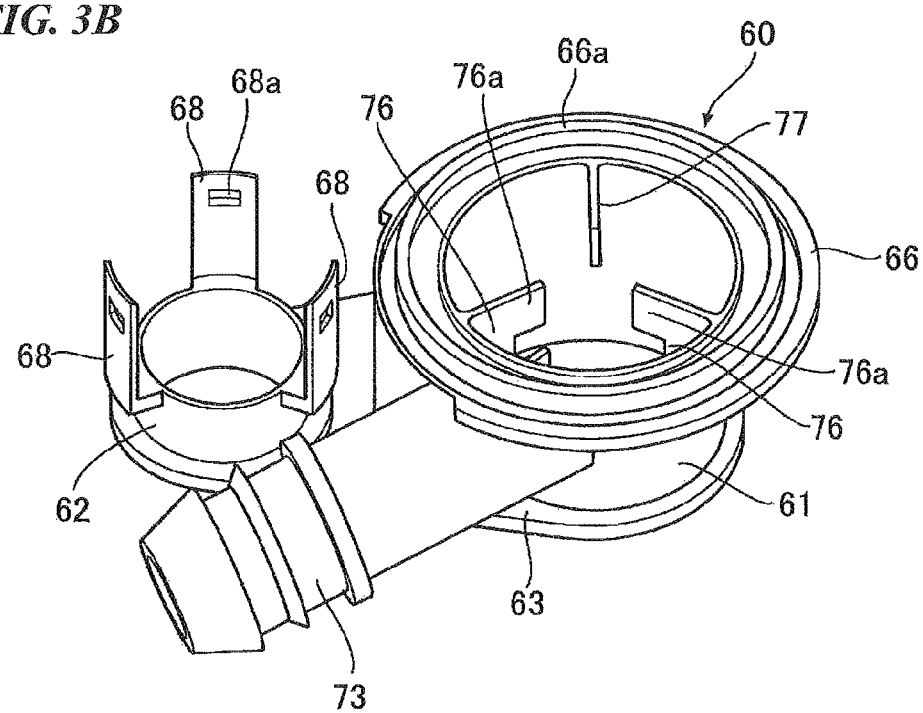
FIG. 3B is a perspective view of the valve device as viewed from a different direction.

As shown in FIGS. 3A and 3B, the cover 60 has a first cylindrical portion 61 having a cylinder-like shape, a second cylindrical portion 62 having similarly a cylinder-like shape, and a shelf wall portion 63 that is disposed between the first cylindrical portion 61 and the second cylindrical portion 62 so as to connect both the cylindrical portions 61, 62 together. The first cylindrical portion 61 is made diametrically wider than the second cylindrical portion 62. In addition, the first cylindrical portion 61 extends downwards longer than the second cylindrical portion 62.

The diametrically constricted upper portion of the circumferential wall 41 of the second casing 40 is inserted into an interior of the second cylindrical portion 62, and the second partition wall 42 having the second opening 43 is disposed in an inner circumference at an upper end side of the second cylindrical portion 62 (refer to FIG. 10).

An upper portion of the circumferential wall 21 of the first casing 20 is mounted at a bottom of the first cylindrical portion 61, so that the first partition wall 22 having the first opening 23 is disposed at a lower end opening portion of the first cylindrical portion 61. A recess portion 64 that is formed lower than the shelf wall portion 63 is provided on a circumferential edge of the first opening 23 (refer to FIG. 10). This recess portion 64 defines part of a ventilation chamber, and the first opening 23 is formed in a bottom portion of the recess portion 64. The first opening portion 23 lies below the shelf wall portion 63.

Figure 5:
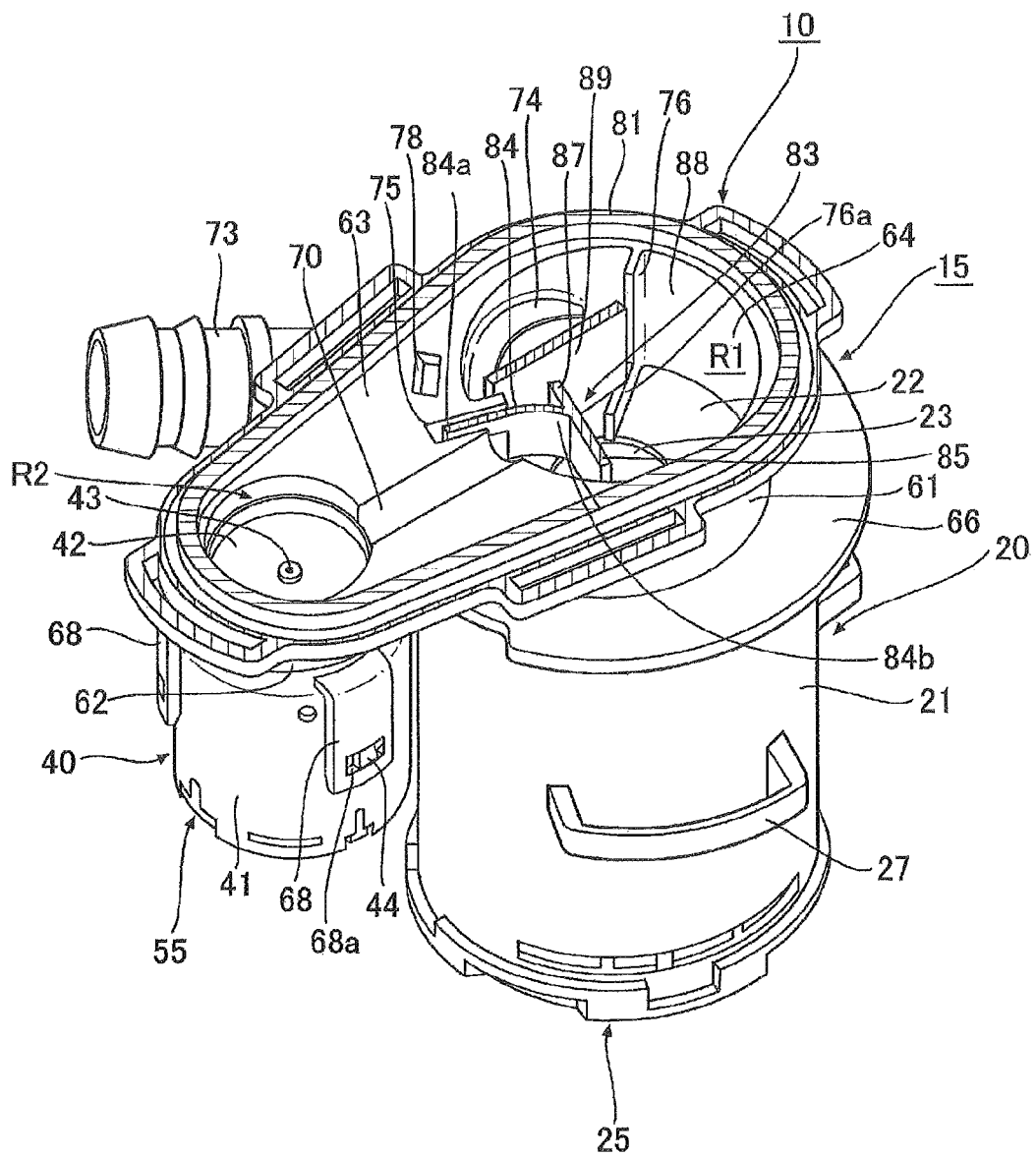
FIG. 5 is a perspective view of the valve device with part of the ceiling wall cut away.
Figure 6:
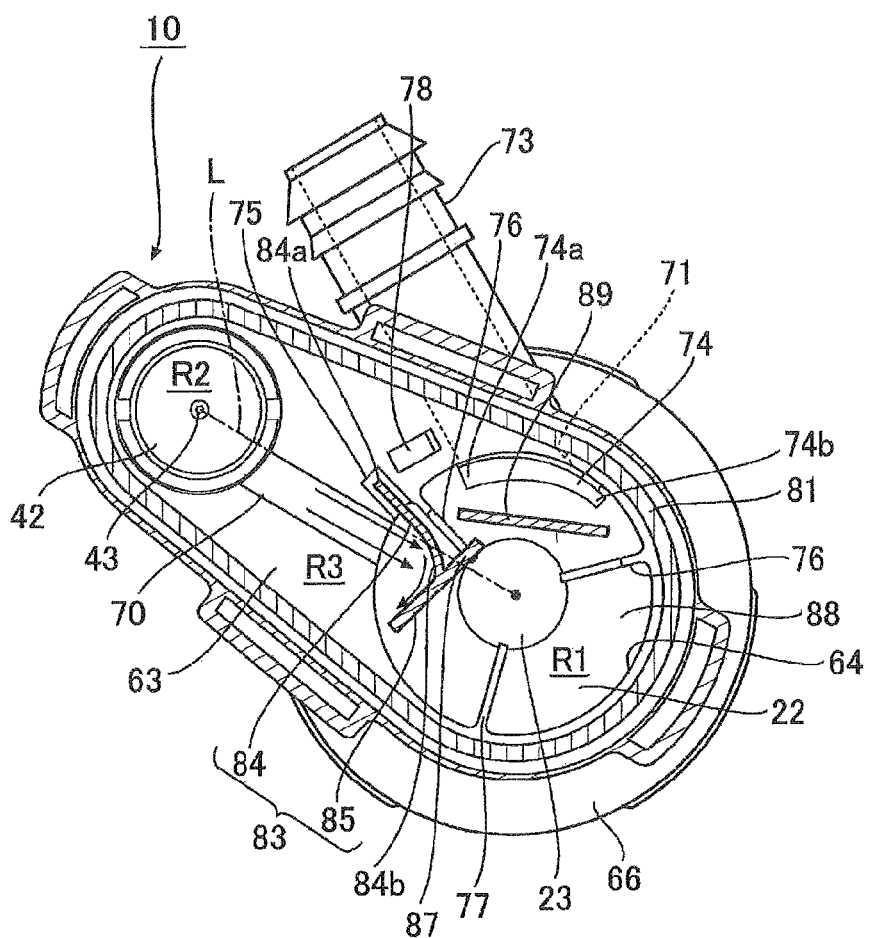
FIG. 6 is a plan view of the valve device with the part of the ceiling wall cut away.

The shelf wall portion 63 extends from a circumferential edge of the second opening 43 provided in the second partition wall 42 on the second cylindrical portion 62 side to an inner circumference of the recess portion 64 that is provided on a circumferential edge of the first opening 23 in the first partition wall 22 on the first cylindrical portion 61 side (refer to FIGS. 5 and 6). A gap R3 is formed between the shelf wall portion 63 and the ceiling wall 80 mounted on the cover 60 (refer to FIGS. 7A, 7B and 9 to 12). A welding groove 65 is formed along upper outer circumferences of both the cylindrical portions 61, 62, and an outer circumference of the shelf wall portion 63 (refer to FIG. 3A).

As shown in FIG. 3A, a flange portion 66 is provided to extend from an outer circumferential edge of a lower end of the first cylindrical portion 61, and an annular welding projecting portion 66a is provided on a circumferential edge of a rear side of the flange portion 66 so as to project therefrom (refer to FIG. 3B). This flange portion 66 is disposed on the circumferential wall 21 of the first casing 20, and the welding projecting portion 66a is disposed on an outer circumference of the annular wall 22a of the first partition wall 22. Then, the first casing 20 is connected to the cover 60 by welding the welding projecting portion 66a to an upper surface of the first partition wall 22, whereby the first casing 20 is connected to the cover 60 (refer to FIG. 10).

Plural engaging pieces 68 each having an engaging hole 68a are provided on an outer circumference of the second cylindrical portion 62 so as to extend downwards therefrom. The diametrically narrowed upper portion of the circumferential wall 41 of the second casing 40 is inserted into the second cylindrical portion 62, and the engaging claws 44 are brought into engagement with the corresponding engaging holes 68a of the engaging pieces 68, whereby the second casing 40 is connected airtightly to the cover 60 by way of the seal ring 45 (refer to FIG. 10).

The connecting method for connecting the casings 20, 40 to the cover 60 is not limited to what has been described above.

When the casings 20, 40 are connected to the cover 60, the lower openings of the cylindrical portions 61, 62 are covered by the partition walls 22, 42, respectively, while when the ceiling wall 80 is mounted on the cover 60, upper openings of the cylindrical portions 61, 62 are covered by the ceiling wall 80, and the shelf wall portion 63 is covered from thereabove by the ceiling wall 80.

As a result, a "ventilation chamber" of the invention is defined by a first ventilation chamber R1 that is provided in the first cylindrical portion 61 to be disposed above the first valve chamber V1, a second ventilation chamber R2 that is provided in the second cylindrical portion 62 to be disposed above the second valve chamber V2 and the gap R3 that establishes a communication between the first ventilation chamber R1 and the second ventilation chamber R2. In this embodiment, as shown in FIG. 10, the first valve chamber V1 and the second valve chamber V2 are disposed side by side (laterally) in a horizontal direction.

When the cover 60 is attached to the casings 20, 40, as shown in FIG. 6, the shelf wall portion 63 that connects the partition walls 22, 42 together is disposed between the first partition wall 22 of the first casing 20 and the second partition wall 42 of the second casing 40. In this embodiment, the first partition wall 22, the second partition wall 42 and the shelf wall portion 63 make up a "partition wall" of the invention.

As shown in FIGS. 3A, 5 and 6, a first groove portion 70 is formed on an upper surface of the shelf wall portion 63 so as to extend from the second partition wall 42 as the second opening 43 side to the inner circumference of the recess portion 64 of the first opening 23 to establish a communication therebetween. The ceiling wall 80 is mounted above the first groove portion 70 via the gap R3 that is defined between the ceiling wall 80 and the shelf wall portion 63 (refer to FIGS. 7A, 7B and 10). The first groove portion 70 communicates with the first ventilation chamber R1 at an end portion, communicates with the second ventilation chamber R2 at the other end portion, and communicates with the gap R3 at a top thereof (refer to FIG. 10).

As shown in FIG. 6, when looking at the valve device 10 from thereabove (when looking at the valve device 10 from a direction facing the partition walls), the first groove portion 70 is situated on an opposite side to a fuel vapor discharge port 71, which will be described later, across a path L extending from the second opening 43 side to the first opening 23 side (a path extending from a center of the second opening 43 to a center of the first opening 23) and is formed into a straight line so as to be almost parallel to the path L.

Figure 7A:
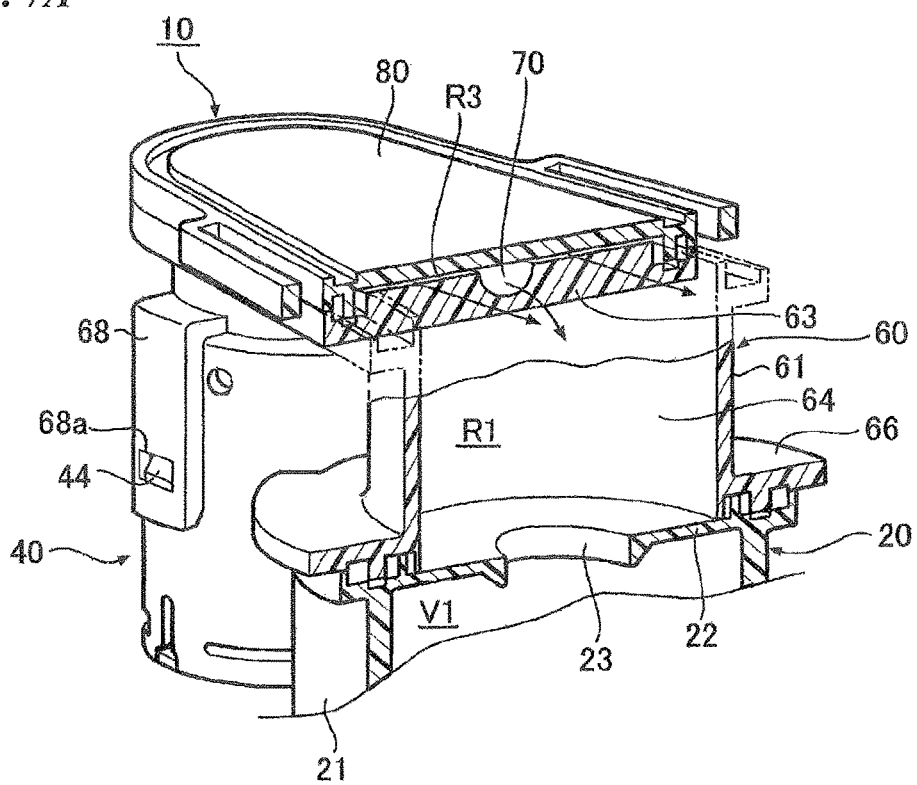
FIG. 7A is an enlarged perspective view of a main part of the valve device with the ceiling wall and a partition wall partially cut away.
Figure 7B:
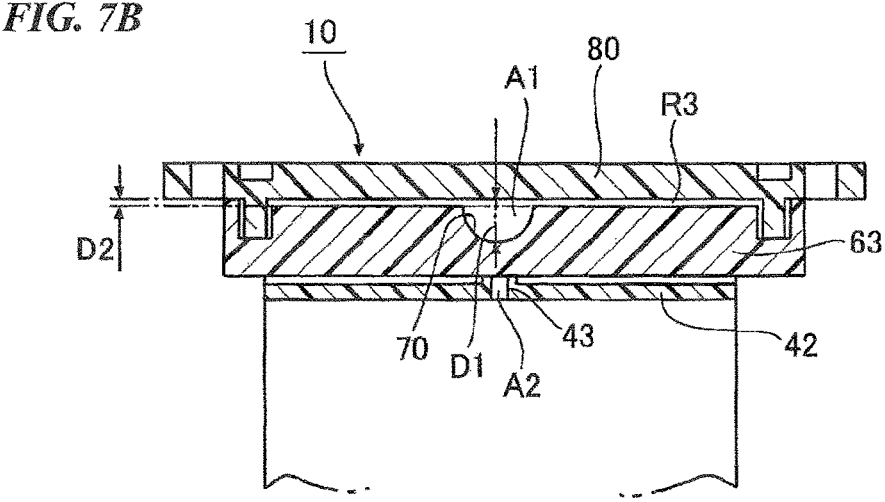
FIG. 7B is a schematic sectional view of the main part taken along a line X-X indicated by arrows X in FIG. 10.

As shown in FIG. 7B, the first groove portion 70 is formed so that a depth D1 of the first groove portion 70 from the upper surface of the shelf wall portion 63 is greater than a height D2 of the gap R3 that is defined between the shelf wall portion 63 and the ceiling wall 80. The depth D1 of the first groove portion 70 is preferably in the range of 2.5 to 3.5 mm, and the height D2 of the gap R3 is preferably in the range of 0.3 to 0.8 mm. In FIG. 7A, a fuel vapor piping 73 and the fuel vapor discharge port 71, which will both be described later, are omitted from illustration as a matter of conveniences.

As shown in FIG. 7B, the first groove portion 70 is formed so that an area A1 of the first groove portion 70 when it is cut along a plane that is normal to the extending direction thereof is greater than an area A2 of the second opening 43 that is formed in the second partition wall 42. The area A1 of the first groove portion 70 is preferably in the range of 1.5 to 20 times and is more preferably in the range of 3 to 7 times the area A2 of the second opening 43.

In this embodiment, although an inner circumference of the first groove portion 70 is shaped into a curved surface (refer to FIGS. 5, 7A and 7B), the shape of the first groove portion 70 is not particularly limited thereto, and hence, an angular groove or a V-shaped groove may be adopted. Plural first groove portions 70 may be formed on the shelf wall portion 63.

In such a state that a predetermined amount of fuel is reserved in the fuel tank with the first opening 23 closed by the raised-up first float valve 30 functioning as a excessive-feeding prevention valve, fuel vapors and air within the fuel tank passes sequentially through mainly the second valve chamber V2, the second opening 43, the second ventilation chamber R2, the first groove portion 70 and the gap R3 and eventually flows into the first ventilation chamber R1. This flow path or line will be referred to as an evaporative emission line. The first groove portion 70 makes up part of this evaporative emission line.

Figure 12:
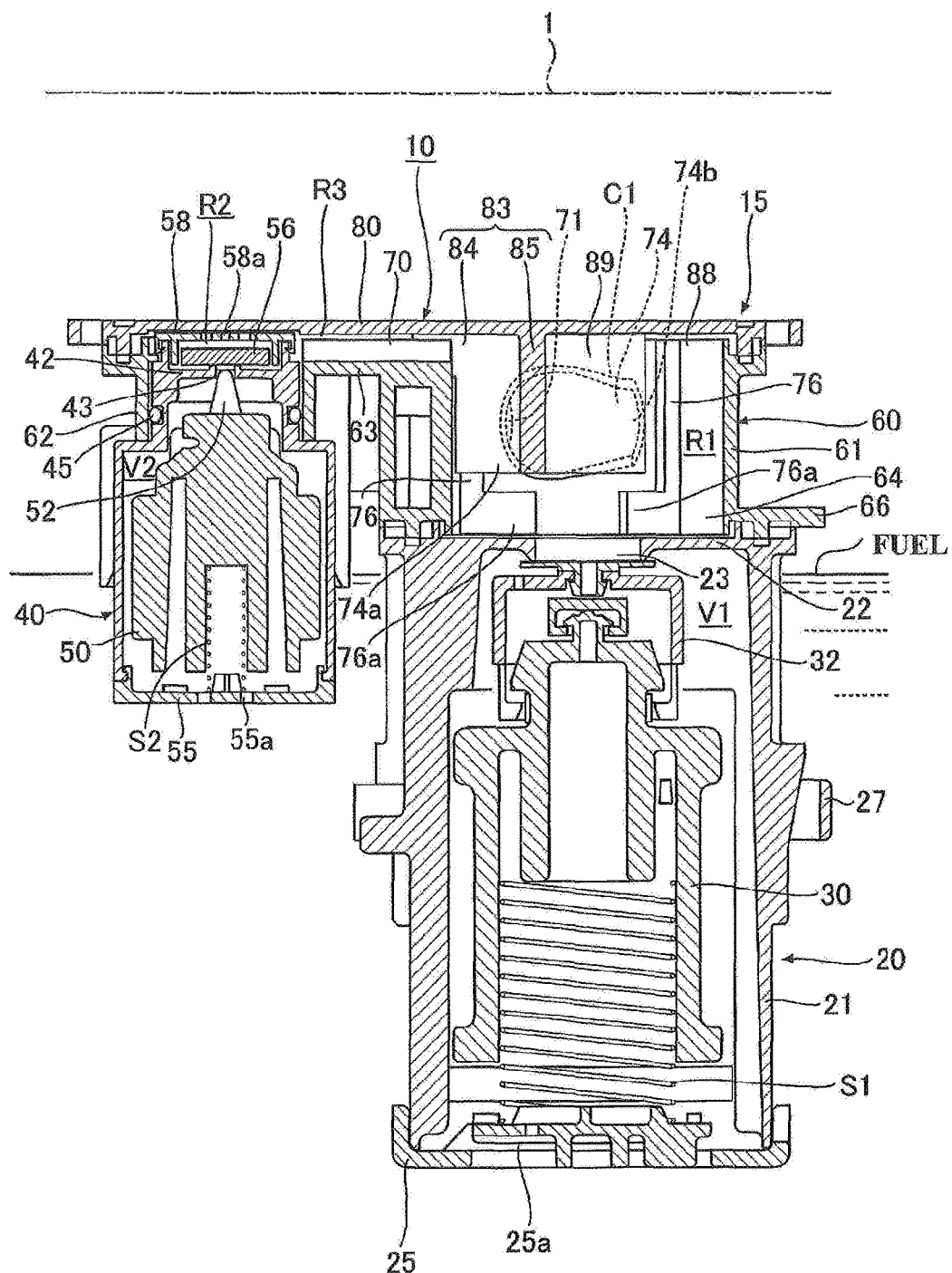
FIG. 12 is a sectional view of the valve device in which the first float valve and the second float valve are in the raised lowered state.
Figure 13:
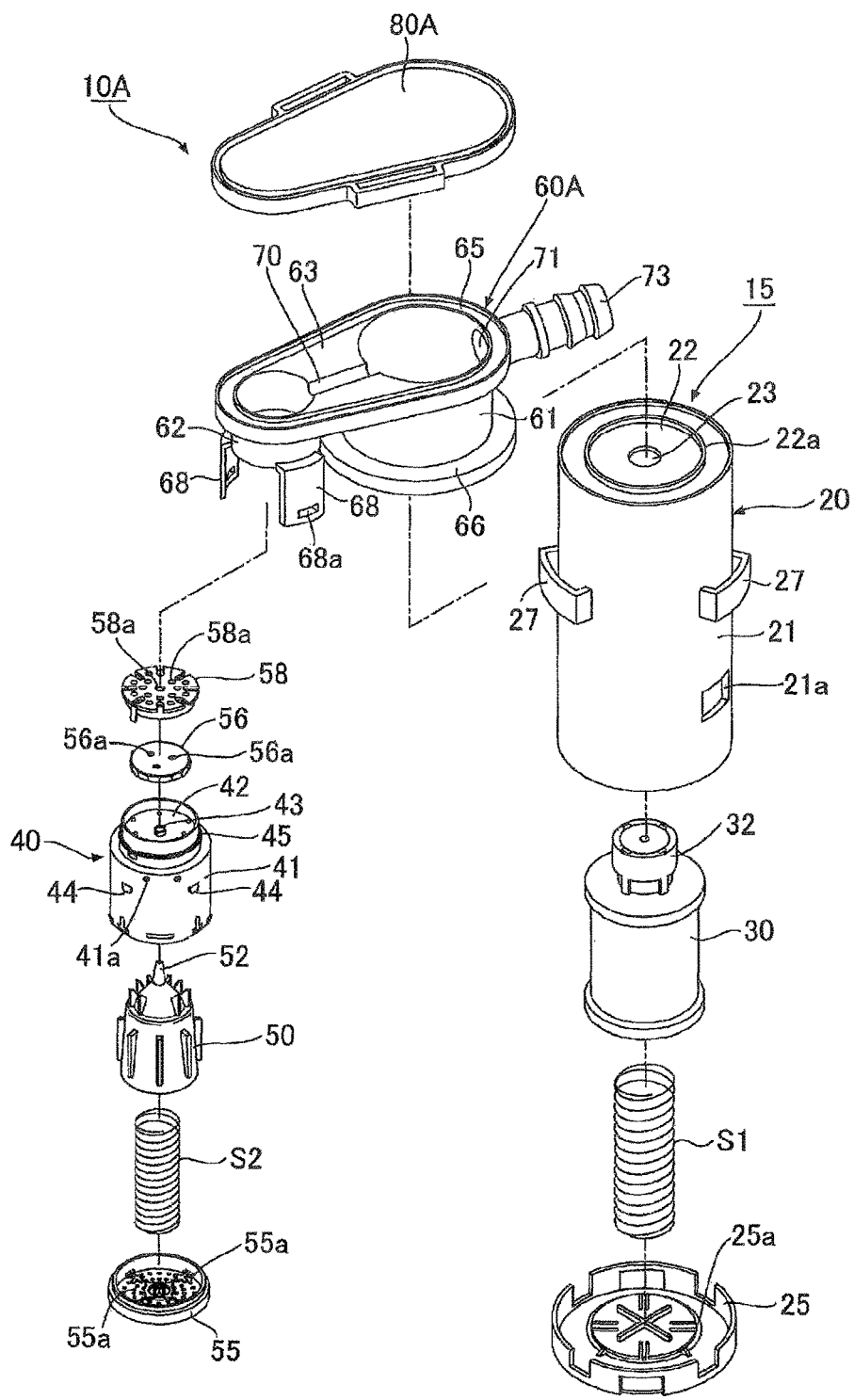
FIG. 13 is an exploded perspective view of a fuel tank valve device according to another embodiment of the invention.
Figure 14:
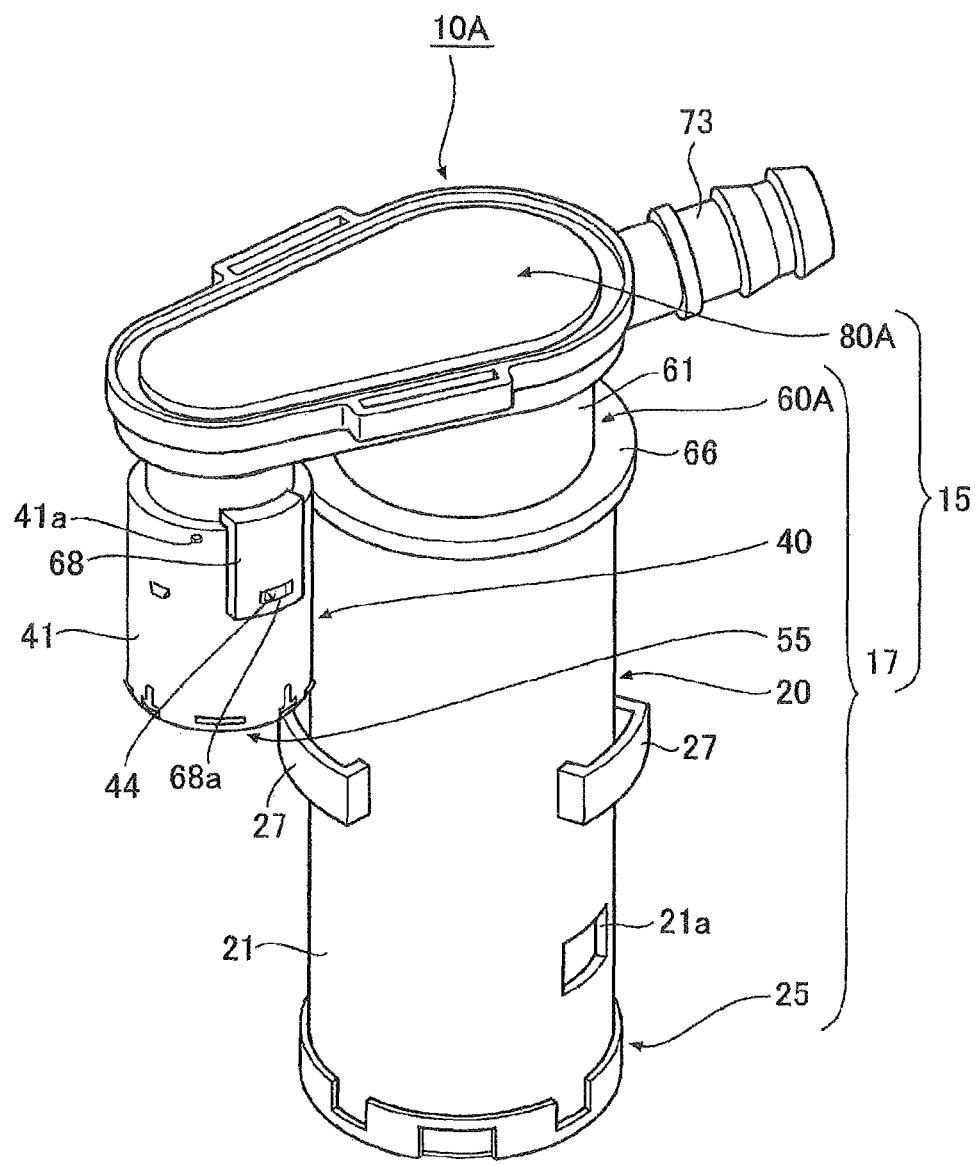
FIG. 14 is a perspective view of the valve device.
Figure 15A:
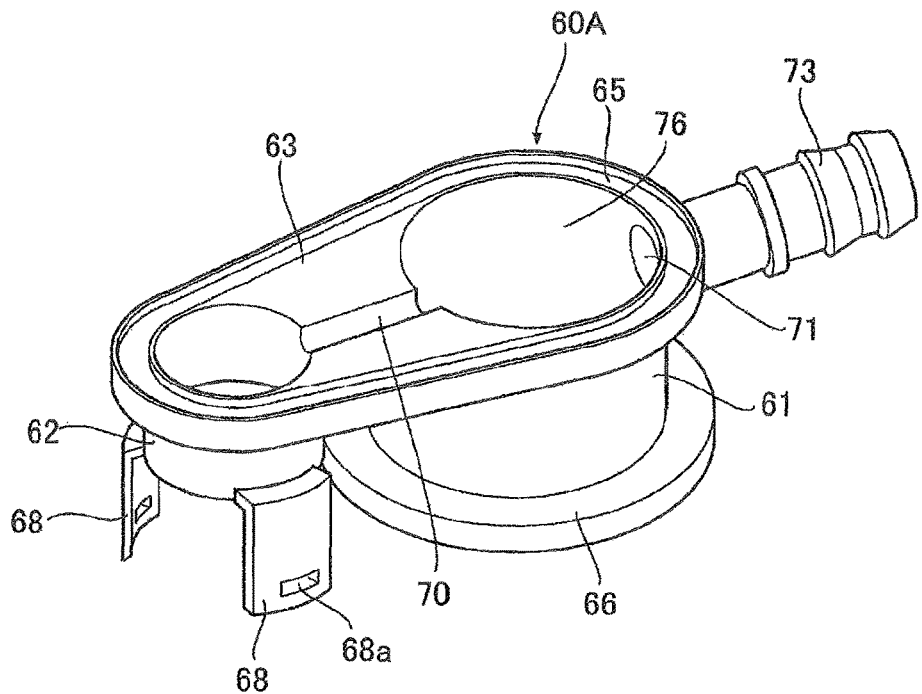
FIG. 15A is a perspective view of a cover that makes up the valve device and FIG. 15B is a perspective view of the valve device as viewed from a different direction.
Figure 15B:
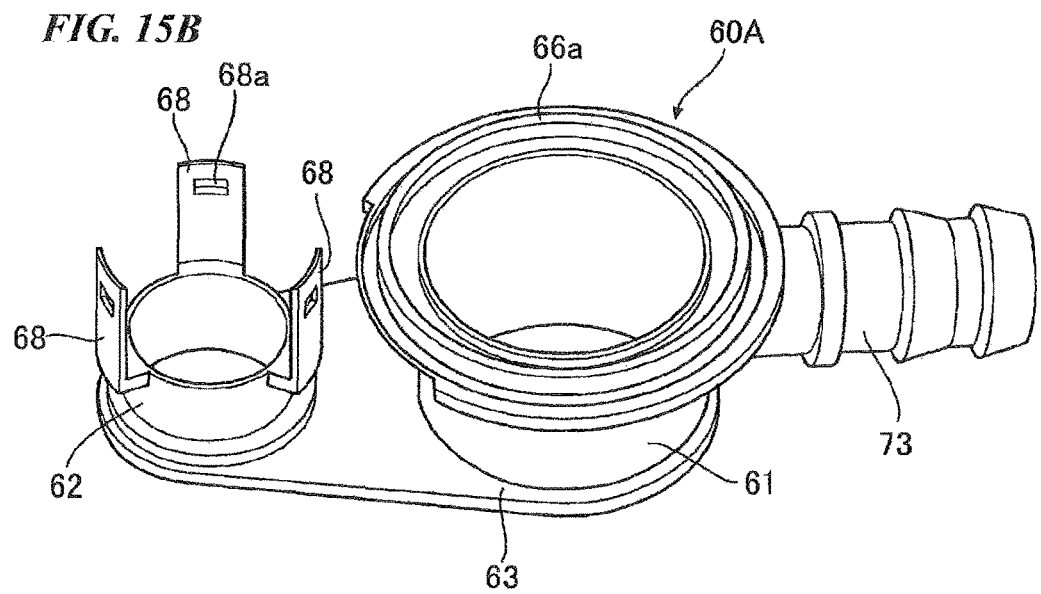

In the valve device 10, a fuel vapor discharge port is formed which communicates with the ventilation chamber. As shown in FIGS. 10 to 12, the fuel vapor discharge port 71 (discharge port 71) communicating with the first ventilation chamber R1 is formed in a predetermined position on an inner circumference of the recess portion 64 in the first cylindrical portion 61. The discharge port 71 of the embodiment is formed on an opposite side to the first groove portion 70 across the path L (refer to FIG. 6). There is no specific limitation imposed on the forming position of the discharge port 71.

A fuel vapor piping 73 (piping 73) that connects to a piping that is disposed outside the fuel tank is connected to the outer circumference of the first cylindrical portion 61 at an acute angle formed between the path L and itself so as to communicate with the discharge port 71 and the first ventilation chamber R1. As shown in FIGS. 9 to 12, this piping 73 passes below the shelf wall portion 63 and extends in a horizontal direction and a proximal end portion thereof is joined to a lower surface of the shelf wall portion 63. Although the piping 73 is provided preferably so that at least part thereof passes below the shelf wall portion 63, the piping 73 does not necessarily have to be shaped in that way. In addition, there is imposed no specific limitation on the angle at which the piping 73 is joined to the outer circumference of the first cylindrical portion 61.

Figure 9:
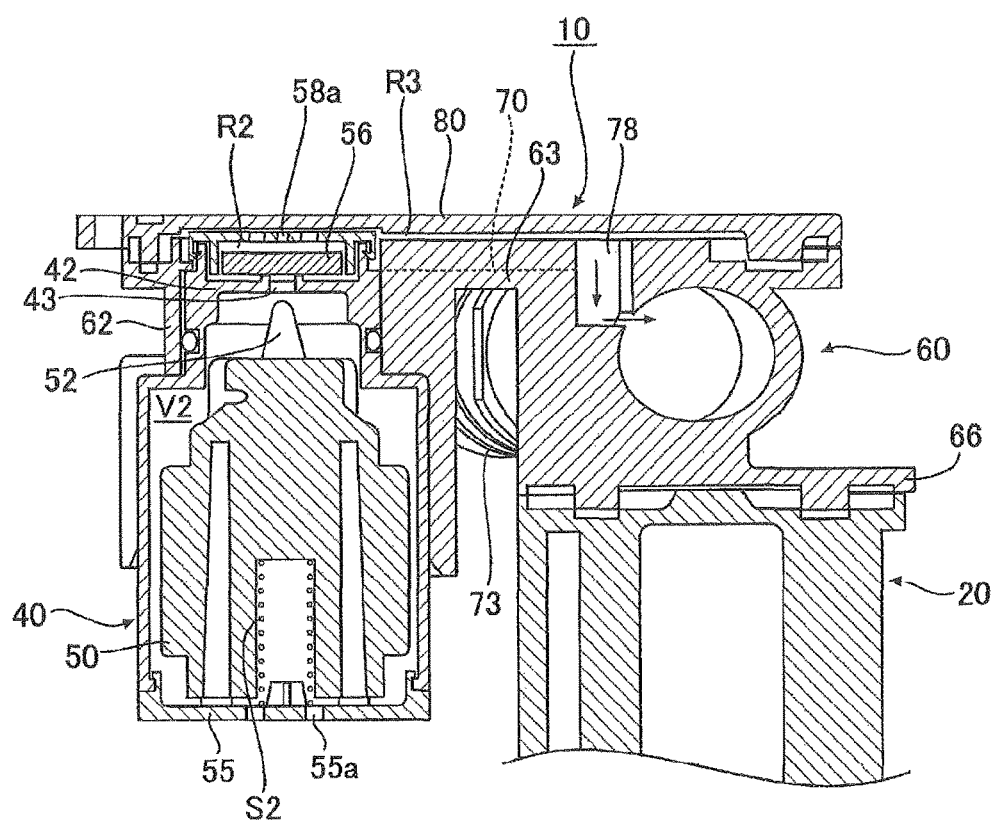
FIG. 9 is an enlarged sectional view of the main part of the valve device as viewed in a different direction from the direction in which the valve device is viewed in FIG. 7.

As shown in FIGS. 5, 6 and 9, the cover 60 that makes up the housing 15 includes a bypass flow path 78 that opens to the shelf wall portion 63 at one end so as to communicate with the gap R3 and opens to an inner circumference of the piping 73 at the other end thereof so as to communicate with the piping 73.

As shown in FIG. 9, in this embodiment, the bypass flow path 78 extends perpendicularly downwards from the upper surface of the shelf wall portion 63 and is shaped so as to communicate with an inner circumference of the proximal end portion of the piping 73 that is joined to a lower surface of the shelf wall portion 63 at a lower end thereof. The bypass flow path 78 of this embodiment has an elongated angular hole shape that extends perpendicularly. However, there is imposed no specific limitation on the shape of the bypass flow path 78, and hence, the bypass flow path 78 may have a circular hole shape, an elliptic hole shape or the like.

The bypass flow path 78 may be made up of a structure in which the opening provided in the shelf wall portion 63 is connected to the opening provided in the inner circumference of the piping 73 with a tubular member or the like.

Figure 8:
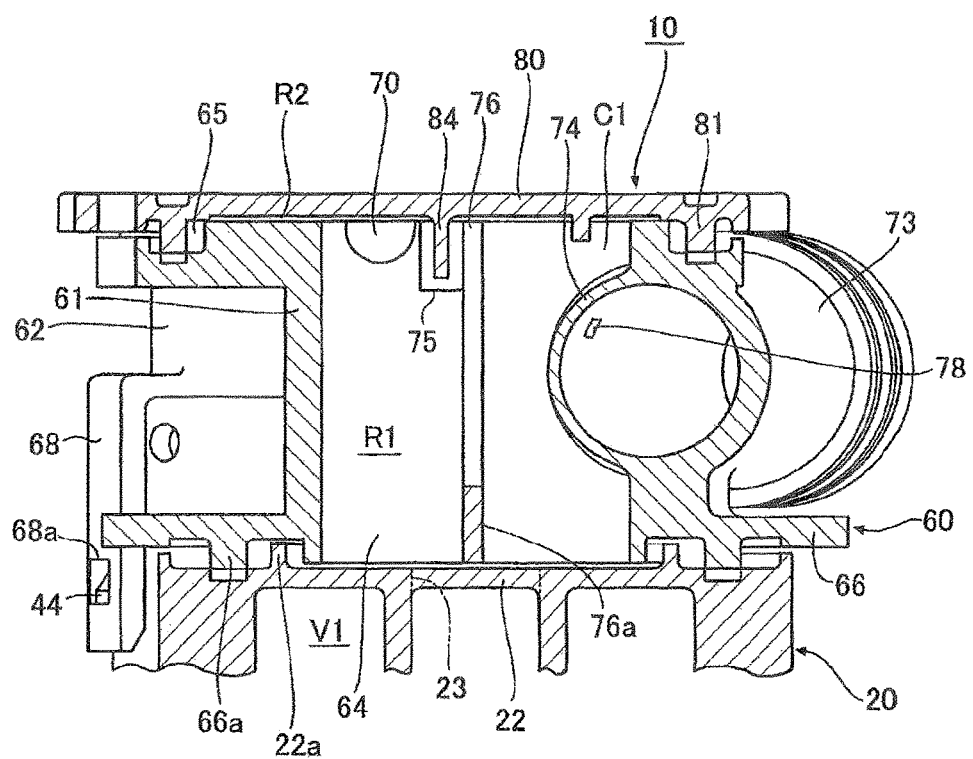
FIG. 8 is an enlarged sectional view of the main part of the valve device.

As shown in FIGS. 3A, 6, 8 and 9, a cylindrical wall 74 surrounding the discharge port 71 is provided on an inner circumferential surface of the first cylindrical portion 61 so as to project therefrom, and a clear space C1 is defined between an outer circumferential surface of the cylindrical wall 74 and an inner surface of the ceiling wall 80 (refer to FIG. 8).

As shown in FIGS. 3A, 5, 6 and 8, a rib inserting groove 75 is formed on the upper surface of the shelf wall portion 63 between the first groove portion 70 and the discharge port 71. This rib inserting groove 75 communicates with the gap R3 at a top and communicates with the first ventilation chamber R1 at one end portion thereof. The rib inserting groove 75 is formed obliquely at a predetermined angle relative to the first groove portion 70 (refer to FIGS. 5 and 6).

As shown in FIGS. 3A, 5 and 6, a pair of vertical ribs 76, 76 are provided on the inner circumference of the first cylindrical portion 61 at circumferential ends of the cylindrical wall 74 so as to extend along an up-to-down direction of the first ventilation chamber R1. Each vertical rib 76 has an L shape in which a lower end portion 76a thereof extends radially inwards of the first ventilation chamber R1 (refer to FIGS. 5 and 10). Distal ends of the lower end portions 76a of the vertical ribs 76 extend so as to project further radially inwards than an inner circumferential edge of the first opening 23 in the first partition wall 22. As shown in FIGS. 3B and 6, a horizontal rib 77 is provided at a lower end of the inner circumference of the first cylindrical portion 61 in a position lying equidistantly from the vertical ribs 76, 76 so as to extend radially inwards of the first ventilation chamber RE A distal end of the horizontal rib 77 projects further radially inwards than the inner circumferential edge of the first opening 23.

Thus, as described above, the main body portion 17 that includes the constituent members (the first casing 20, the first cap 25, the second casing 40, the second cap 55, the cover 60) has the valve chamber (the first valve chamber V1, the second valve chamber V2), the ventilation chamber (the first ventilation chamber R1, the second ventilation chamber R2, the gap R3), the partition wall (the first partition wall 22, the second partition wall 42, the shelf wall portion 63), the recess portion 64 and the discharge port 71.

Figure 4:
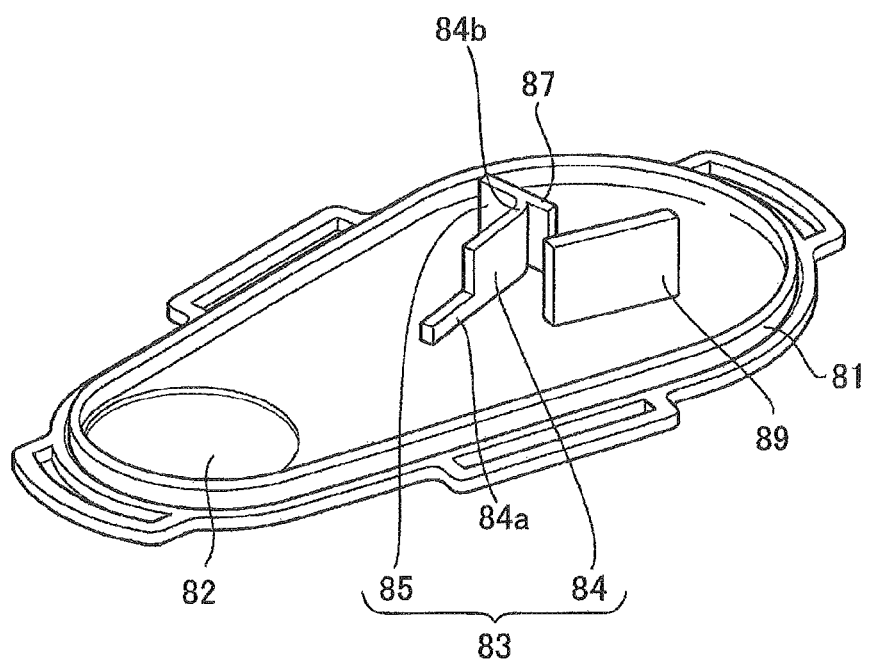
FIG. 4 is a perspective view of a ceiling wall that makes up the valve device.

The ceiling wall 80 that is mounted on the cover 60 is formed into the long plate shape that matches the upper opening portion of the cover 60 as shown in FIGS. 1 and 4. A circular recess portion 82 is formed on an inner surface of the ceiling wall 80 at a second casing 40 side end portion so as to prevent the interference with the lid member 58 that is mounted on the second casing 40.

An annular welding projecting portion 81 is provided so as to project from a circumferential edge of the inner surface of the ceiling wall 80. This welding projecting portion 81 is inserted into the welding groove 65 on the upper surface of the cover 60 to be welded together, whereby the ceiling wall 80 is disposed on the shelf wall portion 63, and the gap R3 is defined between the shelf wall portion 63 and the ceiling wall 80.

In this embodiment, the ceiling wall 80, which is separate from the main body portion 17, is mounted on the main body portion 17, whereby the gap R3 is defined between the shelf wall portion 63 (a "wall portion of the partition wall") and the ceiling wall 80. This facilitates the control of the height of the gap R3, even the small gap R3 can be easily realized.

The mounting construction of the ceiling wall 80 on the cover 60 is not limited to the mode described above.

A rib 83 is formed on the inner surface of the ceiling wall 80 that is disposed above the first ventilation chamber R1 so as not only to pass between the first groove portion 70 and the bypass flow path 78 but also to extend in a direction of moving away from the discharge port 71.

As shown in FIGS. 4 to 6, the rib 83 has a first rib 84 and a second 85. The first rib 84 is formed into a L-like-shaped plate in which a proximal end portion is lowered in height and the other portion is raised to be higher than the proximal end portion (refer to FIG. 4). A proximal end 84a that is formed lower than the other portion is inserted into the rib inserting groove 75, and a distal end 84b is curved to be rounded so as to move away from the discharge port 71. The second rib 85 extends into a straight line at almost right angles to the first rib 84. An extension rib 87 extends on an extension from a proximal end of the second rib 85 towards the discharge port 71 with the same height. A cover wall 89 that is formed into a long plate shape is provided perpendicularly on an opening portion side of the cylindrical wall 74 in a position that is spaced a predetermined distance away from the extension rib 87 and which is inclined at a predetermined angle relative to the first rib 84.

In such a state that the ceiling wall 80 is mounted on the cover 60, as shown in FIGS. 5 and 6, the rib 83 is disposed so as not only to pass between the first groove portion 70 and the discharge port 71 but also to cover a first ventilation chamber R1 side opening of the first groove portion 70, and the cover wall 89 is disposed on the opening portion side of the cylindrical wall 74.

There is imposed no specific limitation on the shapes of the ribs 83, 87 and the cover wall 89.

Air and fuel vapors within the fuel tank that are discharged out when the fuel tank is filled with fuel mainly pass through the first valve chamber V1 and the first opening 23 to flow into the first ventilation chamber R1 and then flow out of the discharge port 71 into the piping 73 so as to be discharged into a canister or the like that is connected to the piping 73. This flow line is referred to as a vent line.

The valve device 10 of this embodiment includes the two float valves 30, 50. However, the valve device 10 may be applied to a valve device including one flat valve.

Next, the operation and advantageous effect of the above-described valve device 10 will be described.

As shown in FIG. 10, in such a state that the fuel tank is not sufficiently filled and hence the first float valve 30 or the second float valve 50 are not submerged in fuel, the first opening 23 and the second opening 43 are kept open.

When fuel is fed into the fuel tank in that state, air and fuel vapors within the fuel tank pass through the vent line (the first valve chamber V1, the first opening 23, the first ventilation chamber R1, discharge port 71 the piping 73) and is then discharged into the canister or the like that lies outside the fuel tank.

Then, when fuel is fed into the fuel tank, raising the fuel level in the fuel tank, the fuel passes through the through hole 25a in the first cap 25 and the through hole 21a in the first casing 20 to flow into the first valve chamber V1. Then, when the first float valve 30 is submerged in the fuel to a predetermined depth, the first float valve 30 floats by the elastic force of the first spring S1 and the buoyancy of the first float valve 30 itself, whereby the valve head 32 closes the first opening 23 in the first partition wall 22 as shown in FIG. 11. Thus, the discharge amount of air and fuel vapors from the fuel tank is reduced, thereby preventing further feeding of fuel.

When the fuel level in the fuel tank is raised as a result of the vehicle turning or being inclined largely, the fuel passes through the through holes 55a in the second cap 55 and the through hole 41a in the second casing 40 to flow into the second valve chamber V2. Then, when the second float valve 50 is submerged in the fuel to a predetermined depth, the second float valve 50 floats by the elastic force of the second spring S2 and the buoyancy of the second float valve 50 itself, whereby the valve head S2 closes the second opening 43 in the second partition wall 42 as shown in FIG. 12. Thus, the fuel is prevented from passing through the second opening 43 to flow into the second ventilation chamber R2, thereby preventing the fuel from spilling out of the fuel tank.

When the vehicle runs on rough roads to eventually vibrate up and down or sway to the left or right or makes a sharp turn, there may be a situation where the second float valve 50 does not rise to close the second opening 43 in time for preventing liquid fuel and splashes of fuel from being forced into the second ventilation chamber R2 from the second opening 43.

As this occurs, the fuel having flown into the second ventilation chamber R2 is restrained from entering the gap R3 defined between the shelf wall portion 63 and the ceiling wall 80. Thus, the fuel intensively flows in the first groove portion 70 that is formed on the shelf wall portion 63 to eventually enter an interior of the first ventilation chamber R1. Then, as shown in FIGS. 6, 7A and 11, the fuel having entered the first ventilation chamber R1 is guided so as to flow away from the discharge port 71 by the rib 83 and then falls along the rib 83 into the recess portion 64 around a circumferential edge of the first opening 23 (refer to FIGS. 6 and 11). Thereafter, the fuel passes through the first opening 23 and then flows into the first valve chamber V1 whereafter the fuel is returned into the fuel tank through the through hole 25a in the first casing 20. Thus, the fuel having entered the first ventilation chamber R1 is restrained from flowing into the discharge port 71, whereby the fuel can be restrained from flowing into the piping 73.

As this occurs, in this embodiment, since the rib 83 is formed on the inner surface of the ceiling wall 80 so as not only to pass between the first groove portion 70 and the bypass flow path 78 but also to extend in the direction of moving away from the discharge port 71, the fuel having entered the second ventilation chamber R2 from the second opening 43 and flown in the first groove portion 70 can be made to flow away from the discharge port 71. Thus, the fuel is further restrained from flowing into the discharge port 71.

In this embodiment, since the cover wall 89, which is provided continuously to the rib 83 that is provided on the ceiling wall 80, is disposed on the opening portion side of the cylindrical wall 74, the fuel can be restrained from flowing into the discharge port 71 more effectively.

In such a state that the first float valve 30 rises, closing the first opening 23 in the first partition wall 22, when the internal pressure of the fuel tank rises, fuel vapors flows from the second opening 43 in the second partition wall 42 into the second ventilation chamber R2. As this occurs, in the valve device 10, since the gap R3 is defined between the shelf wall portion 63, which makes up the partition wall, and the ceiling wall 80, as shown in FIG. 7A, the fuel vapors passes through this gap R3 and flows into the recess portion 64 around the circumferential edge of the first opening 23. Then, the fuel vapors flows into the discharge port 71 provided in the inner circumference of the recess portion 64 to thereby be discharged from the piping 73.

As described above, in this valve device, liquid fuel can flow through the first groove portion 70 formed on the shelf wall portion 63 while fuel vapors can flow through the gap R3 defined between the shelf wall portion 63 and the ceiling wall 80. Thus, the flow paths can be selected according to the natures of liquid fuel and fuel vapors, whereby liquid fuel and fuel vapors are allowed to flow smoothly.

As this occurs, in this embodiment, since the discharge port 71 is formed in the inner circumference of the recess portion 64 in the position that differs from the position where the first groove portion 70 cuts therein in the circumferential direction, the fuel having flown through the first groove portion 70 into the first ventilation chamber R1 is restrained from flowing into the discharge port 71. Thus, the fuel is restrained from flowing into the piping 73 more effectively.

In this embodiment, as described above, since the depth D of the first groove portion 70 from the upper surface of the shelf wall portion 63 is greater than the gap R3 defined between the shelf wall portion 63 and the ceiling wall 80 (refer to FIG. 7A), the fuel having flown into the second ventilation chamber R2 from the second opening 43 is allowed to intensively flow through the first groove portion 70.

In this embodiment, the first groove portion 70 is formed so that the area A1 of the first groove portion 70 that results when cutting the first groove portion 70 along the plane that is perpendicular to the extending direction of the first groove portion 70 is greater than the area A2 of the second opening 43 formed in the second partition wall 42 (refer to FIG. 7A). Thus, the fuel having flown into the second ventilation chamber R2 from the second opening 43 is allowed to be effectively collected into and further intensively flown through the first groove portion 70.

As described above, in this valve device 10, fuel vapors passes through the gap R3 defined between the shelf wall portion 63 and the ceiling wall 80 to flow into the recess portion 64 around the circumferential edge of the first opening 23 and then flows into the discharge port 71 in the inner circumference of the recess portion 64 to thereby be discharged into the canister or the like from the piping 73.

However, for example, when the vehicle is put in an inclined state as when parked on an inclined road like a slope or driven on a long slope or the like, there may occur a situation in which the recess portion 64 is submerged in the fuel whereby the discharge port 71 is closed. Thus, fuel vapors are prevented from being released from the piping 73. In contrast with the above-described situation, according to the valve device 10, even though the situation really occurs, since the bypass flow path 78 is provided which opens to the shelf wall portion 63 to communicate with the gap R3 at one end and opens to an inner circumference of the piping 73 to communicate with the piping 73 at the other end, fuel vapors are allowed to pass through the bypass flow path 78 to flow into the piping 73 to be eventually discharged from the piping 73 (refer to FIGS. 5, 6 and 9). In addition, since the one end of the bypass flow path 78 opens to the gap R3 over the shelf wall portion 63, liquid fuel is restrained from flowing therethrough.

According to the embodiment, since the piping 73 is provides so that at least part thereof passes below the shelf wall portion 63, the one end and the other end of the bypass flow path 78 can be made to communicate with the piping 73 that is connected to the first cylindrical portion 61 at the acute angle relative to the path L by way of a relatively short path, whereby the bypass flow path 78 can be formed easily.

According to the embodiment, since the bypass flow path 78 is shaped so that it extends perpendicularly downwards from the upper surface of the shelf wall portion 63 so as to communicate with the inner circumference of the piping 73 at a lower end thereof (refer to FIG. 9), the bypass flow path 78 can be formed along a direction in which a housing forming mold (here, a cover 60 forming mold) is removed, which can simplify the construction of the mold, thereby reducing the production costs.

Another embodiment of a fuel tank valve device of the invention is shown in FIGS. 13 to 19. Like reference numerals will be given to substantially-corresponding portions to those of the above-described embodiment, and the description thereof will be omitted here.

A fuel tank valve device 10A (valve device 10A) of this embodiment differs from the valve device of the previous embodiment mainly in constructions of a cover that makes up a housing and a ceiling wall that is mounted on the cover.

Figure 16:
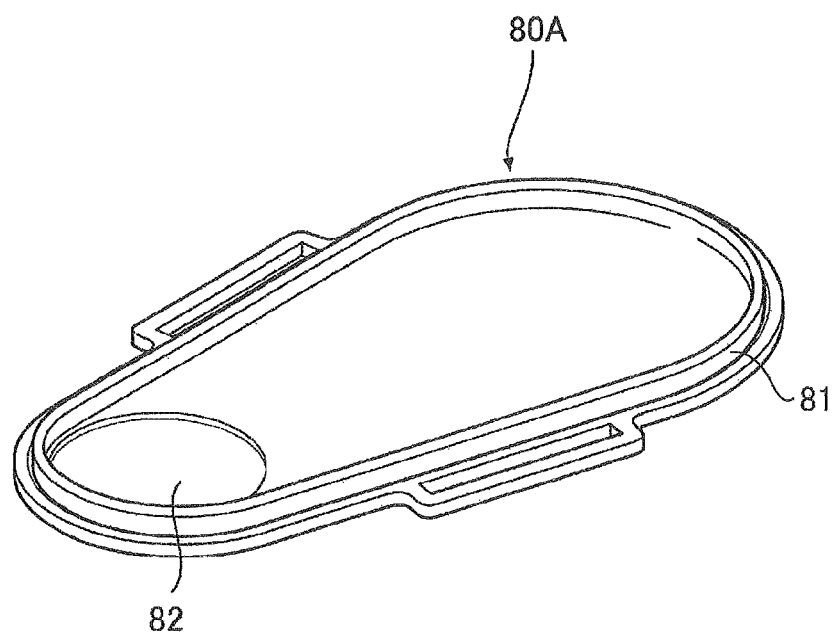
FIG. 16 is a perspective view of a ceiling wall that makes up the valve device.
Figure 17:
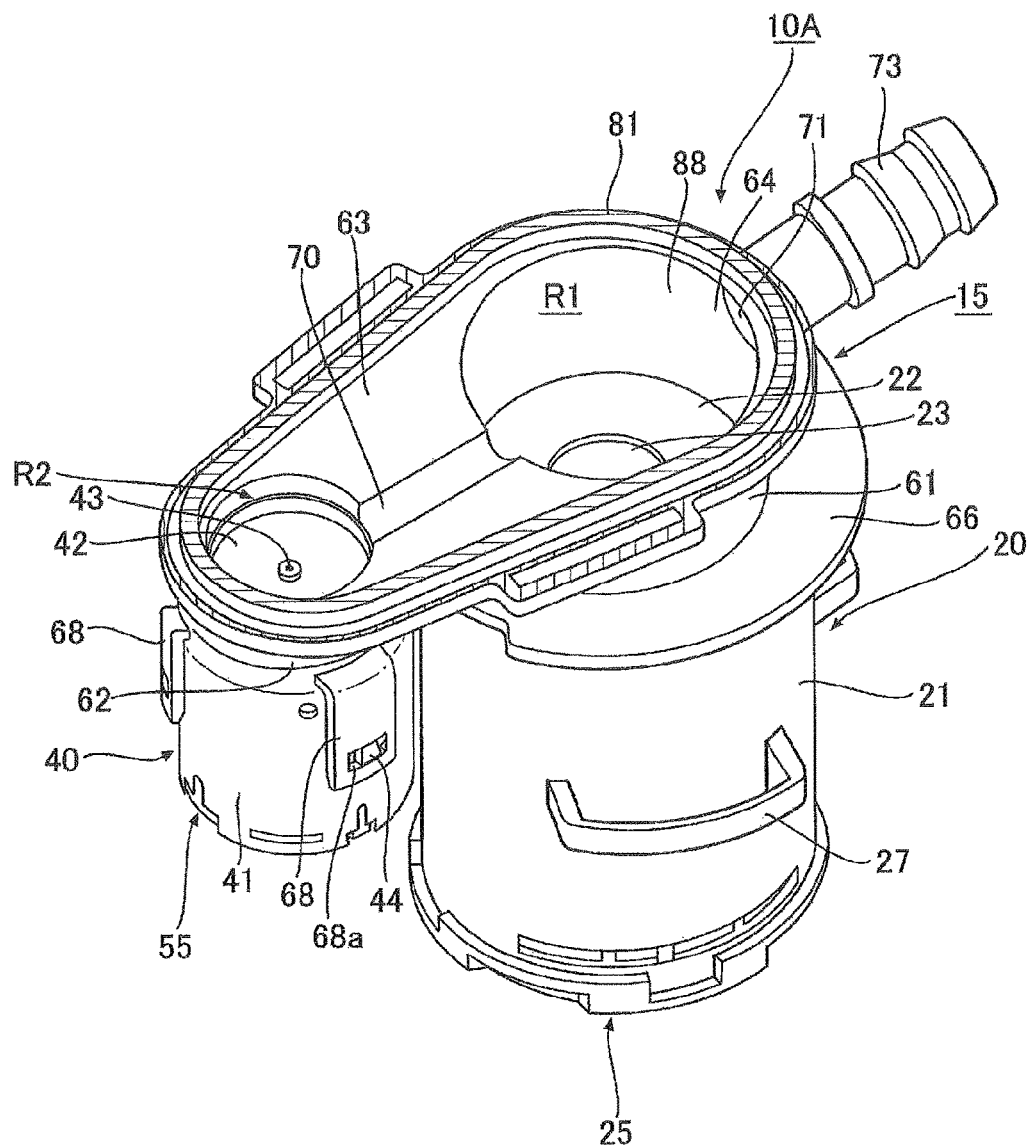
FIG. 17 is a perspective view of the valve device with part of the ceiling wall cut away.
Figure 18:
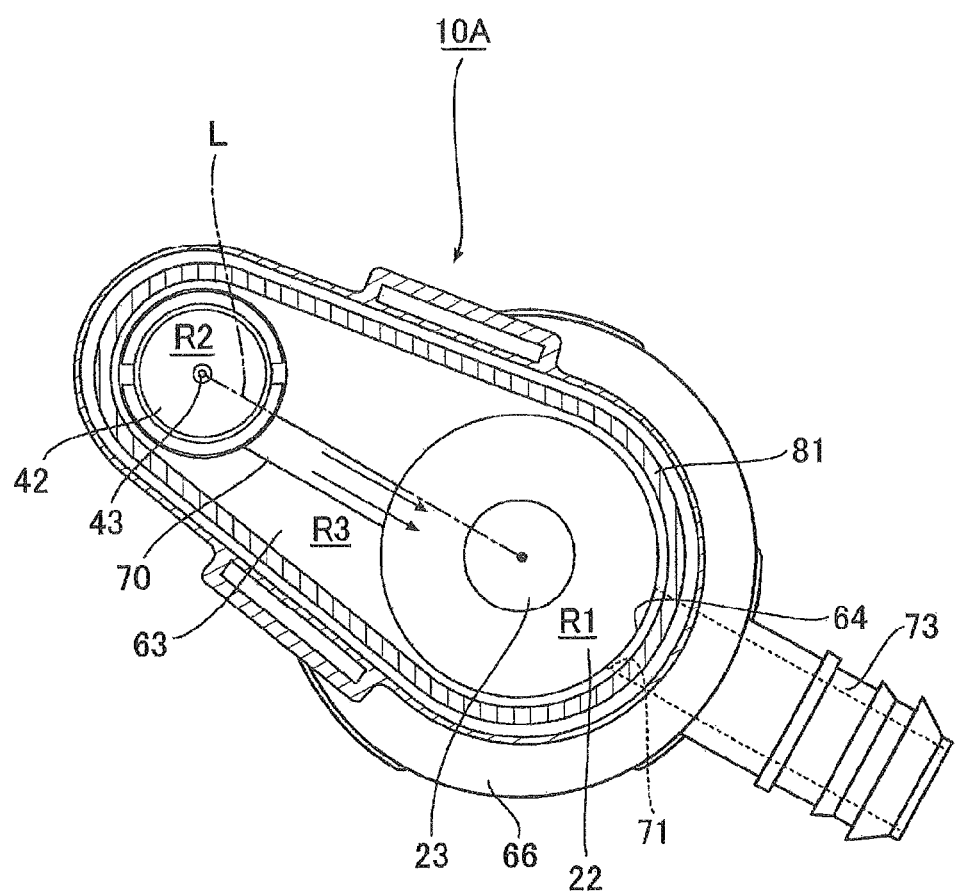
FIG. 18 is a plan view of the valve device with the part of the ceiling wall cut away.
Figure 19:
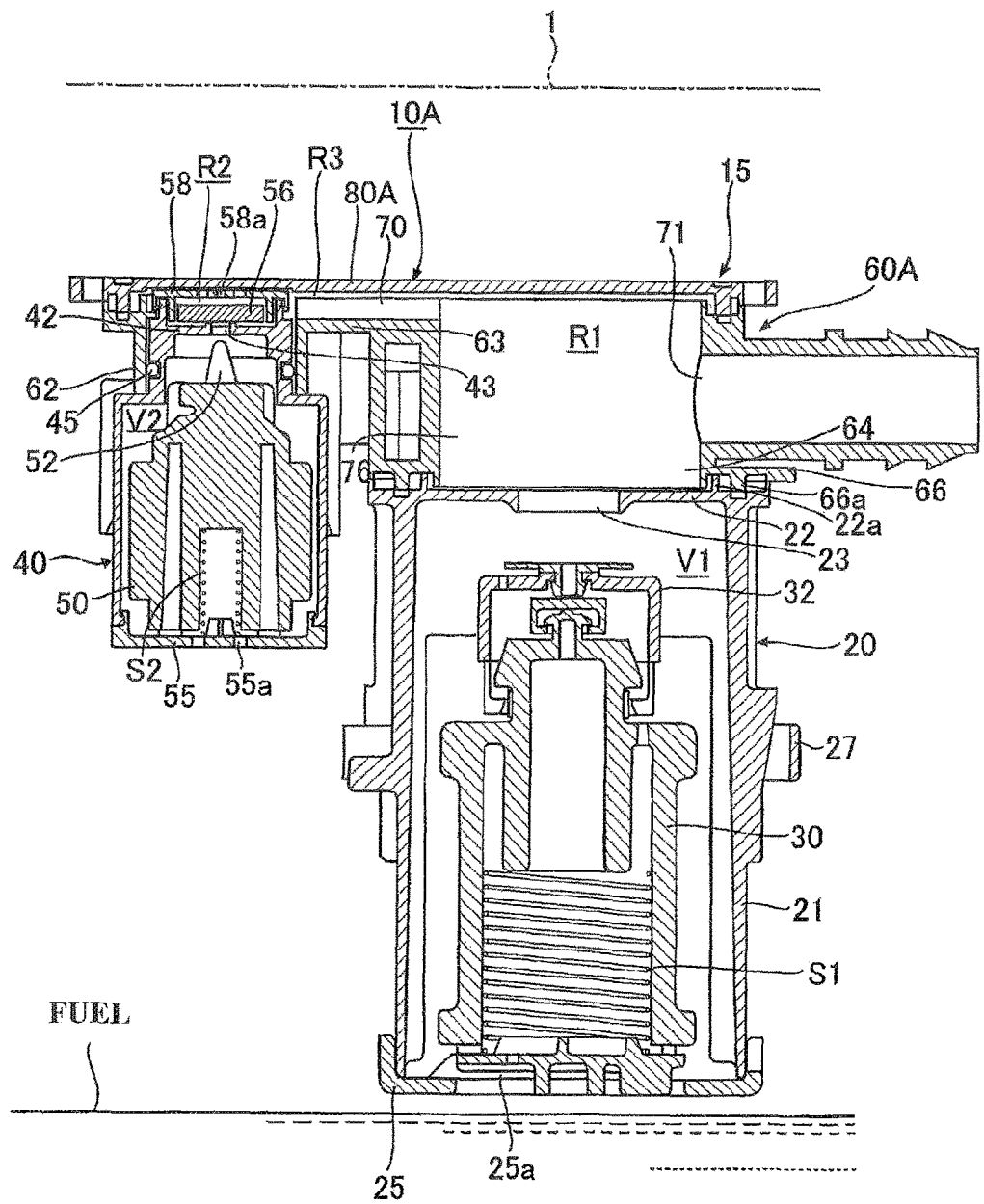
FIG. 19 is a sectional view of the valve device.

Namely, a cover 60A of this embodiment differs from that of the previous embodiment in a position where a discharge port 71 is formed and an angle at which a piping 73 is connected to the casing 60A. As shown in FIGS. 15A, 15B, 17 and 18, the discharge port 71 in the cover 60A is formed in a different position (in this embodiment, a position that faces a first groove portion 70) from the position where the first groove portion 70 of the previous embodiment is formed in a circumferential direction of an inner surface of a recess portion 64. As shown in FIG. 18, when looking at the valve device 10A from thereabove, the piping 73 is connected to an outer circumference of a first cylindrical portion 61 of the cover 60A so to be on an extension of a path L that extends from a second opening 43 to a first opening 23. As shown in FIG. 16, a ceiling wall 80A of this embodiment is formed into a long plate shape, and the rib 83 and the cover wall 89 that are provided on the ceiling wall 80 in the previous embodiment are not provided thereon.

In this embodiment, too, as to fuel having flown from the second opening 43 into a second ventilation chamber R2, liquid fuel can flow through the first groove portion 70 formed on the shelf wall portion 63, whereas fuel vapors can flow through a gap R3 defined between the shelf wall portion 63 and the ceiling wall 80A. Thus, the liquid fuel and fuel vapors are allowed to flow smoothly.

A further embodiment of a fuel tank valve device of the invention is shown in FIGS. 20 to 30. Like reference numerals will be given to substantially-corresponding portions to those of the above-described embodiment, and the description thereof will be omitted here.

A fuel tank valve device 10B (valve device 10B) of this embodiment differs from those of the previous embodiments mainly in the shape of a cover 60B. In association with this different shape of the cover 60B, the shapes of a first casing 20B, a second casing 40B and a ceiling wall 80B also differ from those of the previous embodiments.

Firstly, the first casing 20B and the second casing 40B will be described. An annular flange 24 is provided on the first casing 20B so as to project from an outer circumferential edge of a first partition wall 22, and an annular wall 24a is provided on the flange 24 so as to project from an outer circumferential edge of the flange 24.

Figure 25:
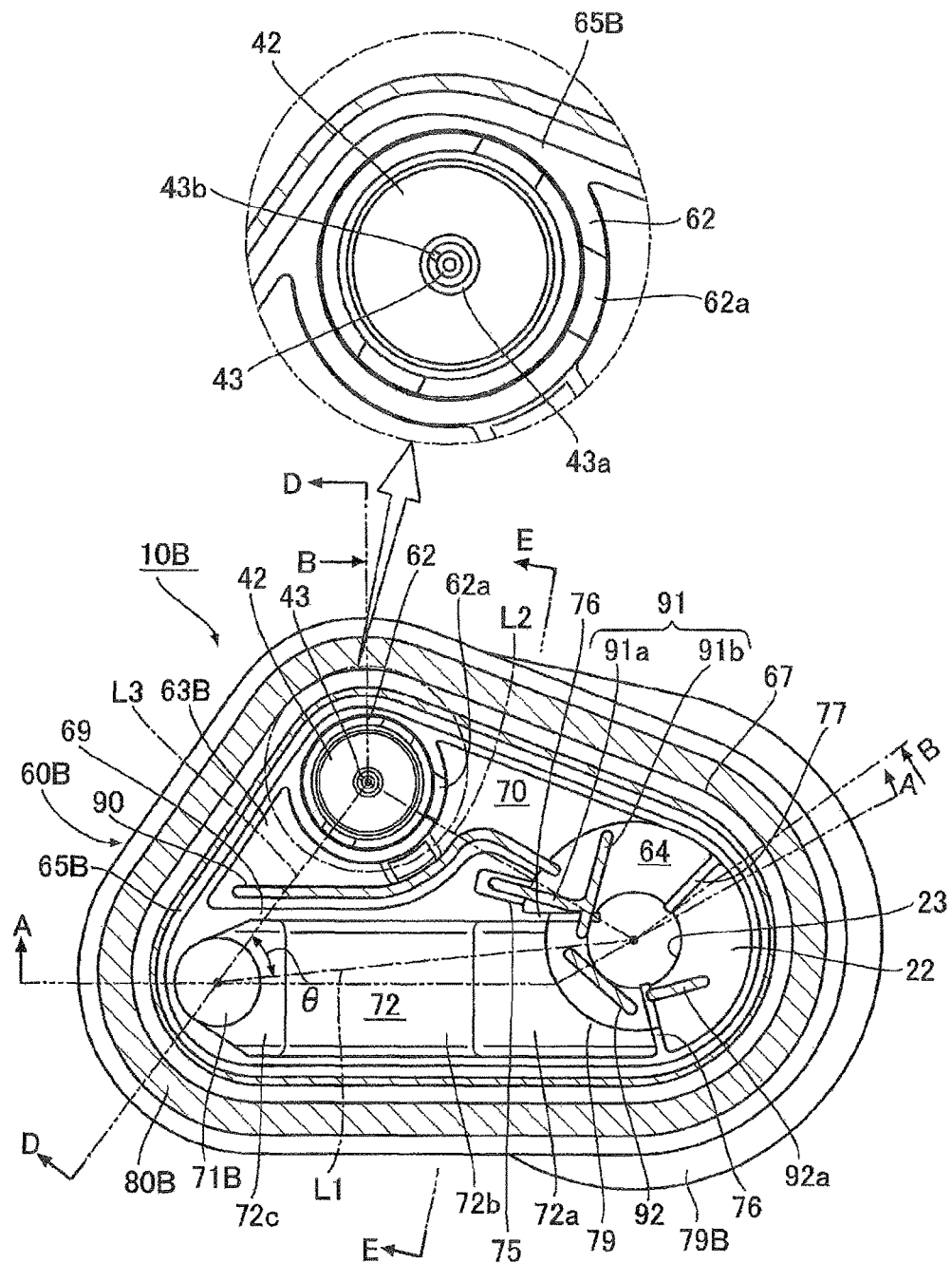
FIG. 25 is a plan view of the valve device with the part of the ceiling wall cut away.

As shown in FIG. 25, a notch 43b that is formed in a cylindrical projecting portion 43a around a second opening 43 of the second casing 80B is disposed so as to be positioned opposite to a notch 62a (which will be described later) that is formed in a second cylindrical portion 62 so as to face a first opening 23. U-like-shaped holding frames 46 are provided below engaging claws 44 that are provided on a circumferential wall 41 of the second casing 40B so as to project therefrom.

Figure 22A:
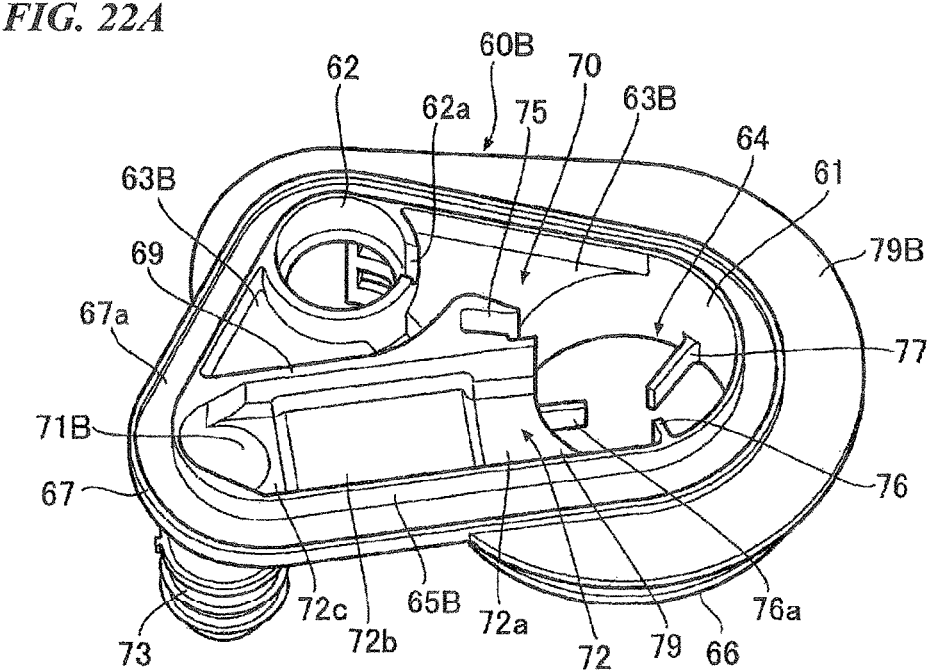
FIG. 22A is a perspective view of a cover that makes up the valve device and FIG. 22B is a perspective view of the valve device as viewed from a different direction.

The cover 60B of this embodiment has, as shown in FIG. 22A, a shelf wall portion 63B and a frame-shaped outer wall 65B that is provided so as to rise from a circumferential edge of the shelf wall portion 63B. Thus, the cover 60B is formed into a thin box shape that has wall portions formed underneath and around an outer circumference thereof and which is opened on a top or upper surface side thereof. A welding groove 67a where the ceiling wall 80B is welded is formed along an outer circumference of the outer wall 65B, and an annular wall portion 67 whose height is shorter than a height of the outer wall 65B is provided along the outer circumference of the outer wall 65B with the welding groove 67a disposed therebetween.

As shown in FIGS. 26 to 29, in such a state that the ceiling wall 80B is mounted on the cover 60B, a predetermined gap R3 is defined between the outer wall 65B and an inner surface (which heretofore means a ceiling surface of a ventilation chamber) of the ceiling wall 80B. The outer wall 65B is disposed so as to surround a first valve chamber V1 where a first float valve 30 is accommodated, a second valve chamber V2 where a second float valve 50 is accommodated and a third opening 71B.

Referring to FIG. 25 together, when looking at the cover 60B that make up a housing 15 from thereabove, the shelf wall portion 63B has a triangle-like shape and apexes of the triangular shape are each rounded into an arc shape.

Figure 22B:
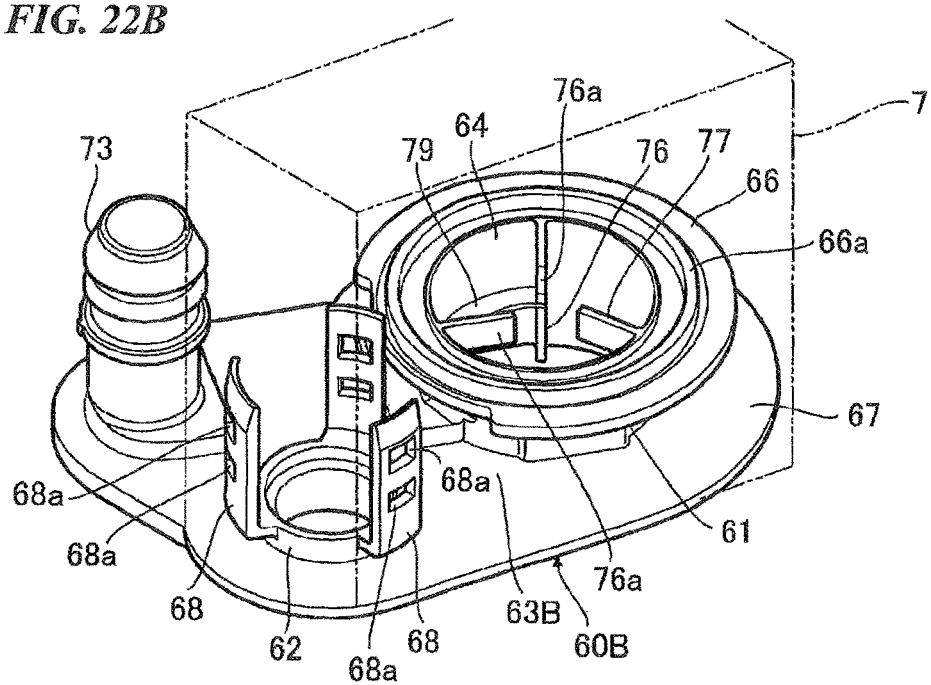
Figure 26:
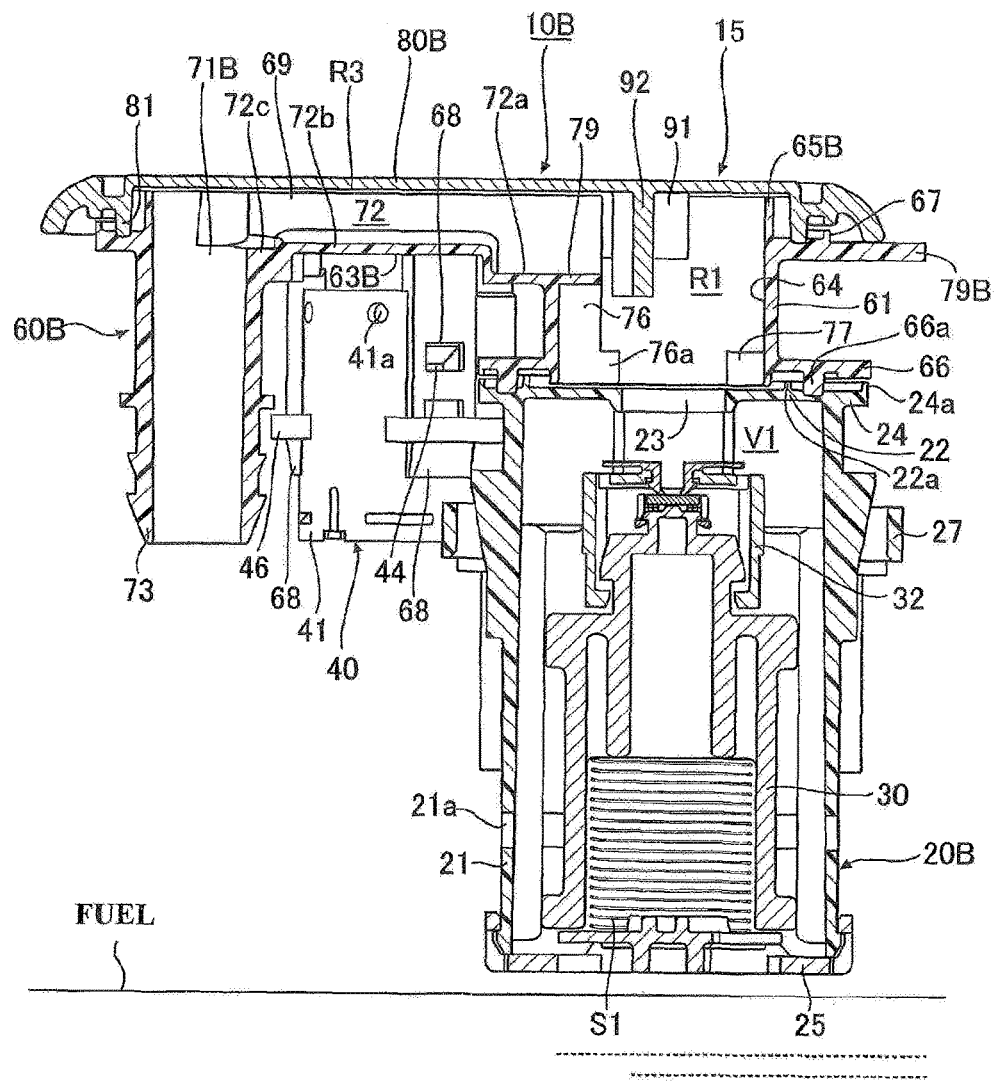
FIG. 26 is a sectional view taken along a line A-A indicated by arrows A in FIG. 6.
Figure 27:
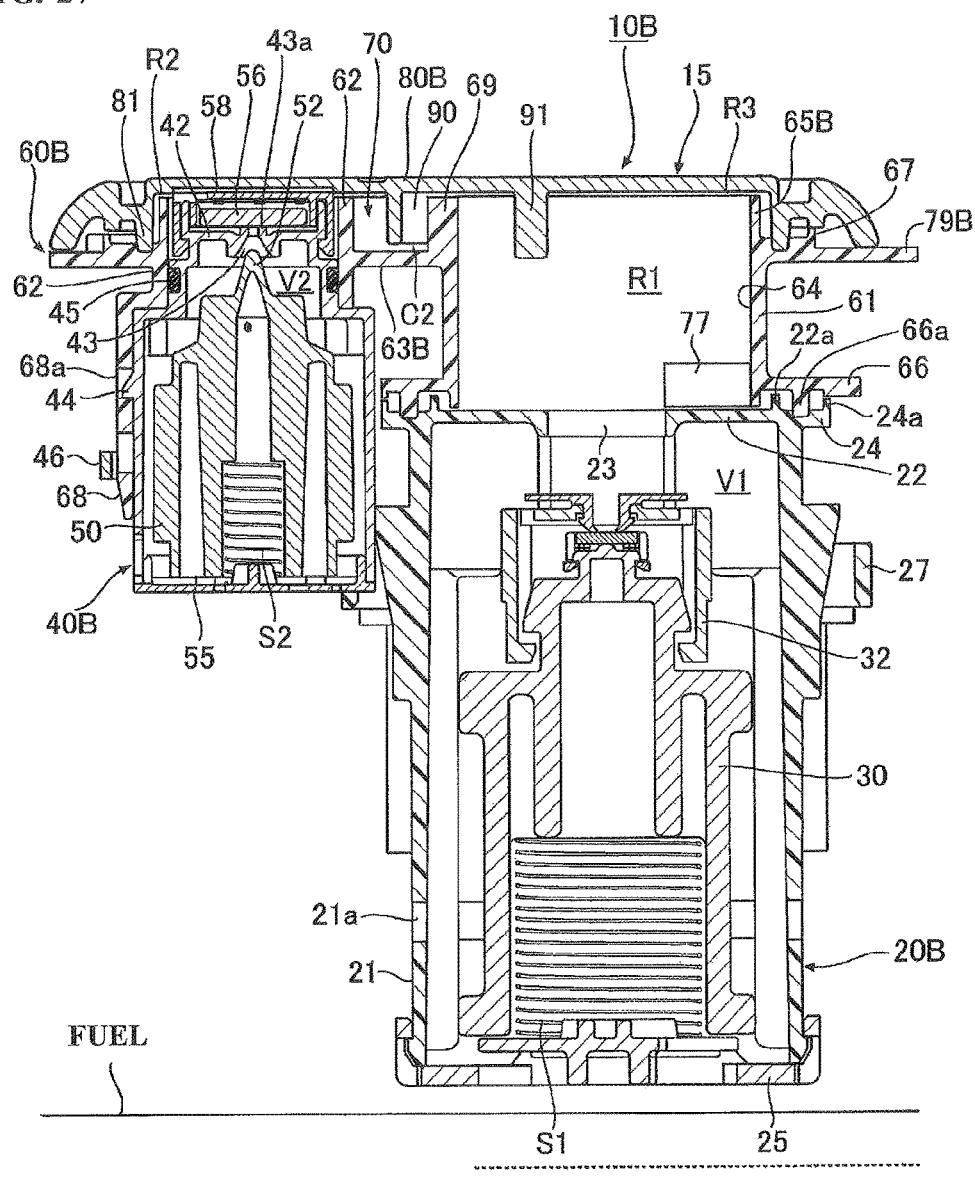
FIG. 27 is a sectional view taken along a line B-B indicated by arrows B in FIG. 6.

As shown in FIGS. 22B, 26 and 27, a cylinder-like first cylindrical portion 61 extending downwards is provided in one of the apexes of the triangular shelf wall portion 63B so as to be disposed around a circumference of the first opening 23. This first cylindrical portion 61 opens in a direction that is at right angles to the shelf wall portion 63B, so that, when looking at the cover 60B from thereabove, a lower portion of the first cylindrical portion 61 becomes visible.

Then, a welding projecting portion 66a on a rear side of a flange portion 66 of the first cylindrical portion 61 is disposed, as shown in FIGS. 26 and 27, on a radially outer side of an annular wall 22a of the first partition wall 22 of the first casing 20B and a radially inner side of the annular wall 24a of the flange 24, and the welding projecting portion 66a is welded to an upper surface of the first partition wall 22 in the location where the welding projecting portion is so disposed, whereby the first casing 20B is connected to the cover 60B.

As a result, the first partition wall 22 of the first casing 20B is disposed at a lower opening portion of the first cylindrical portion 61, and the first opening 23 is disposed at a center of the first cylindrical portion 61. Thus, as shown in FIG. 25, when looking at the cover 60B from thereabove, the first opening 23 is disposed in the one of the apexes of the triangular cover 60B via the first cylindrical portion 61.

As shown in FIGS. 22A, 24, 25 and 27, a cylindrical second cylindrical portion 62 is provided in another of the apexes of the triangle-like shelf wall portion 63B so as to be disposed around a circumference of the second opening 43. This second cylindrical portion 62 projects upwards from an upper surface of the shelf wall portion 63B (a ceiling wall 80 side surface) to the same height as that of the outer wall 65B so as to define the predetermined gap R3 between the ceiling surface of the ceiling wall 80 and itself and also projects downwards from a lower surface of the shelf wall portion 63B (a surface on a side that faces the first casing 20B and the second casing 40B) over a predetermined length. The second cylindrical portion 62 opens in a direction that is at right angles to the shelf wall portion 63B, so that when looking at the cover 60B from thereabove, a lower portion of the second cylindrical portion 62 becomes visible.

As shown in FIGS. 22A, 22B, 24 and 25, the notch 62a communicating with the ventilation chamber is formed in a portion of a circumferential surface of the second cylindrical portion 62 that faces the first opening 23 at an upper portion there. This notch 62a is disposed opposite to the notch 43b that is provided in the upper projecting portion of the second opening 43 (refer to FIG. 25).

As shown in FIG. 22B, in this embodiment, a pair of engaging holes 68a, 68a are formed along a vertical direction of each engaging piece 68. When a diametrically narrowed circumferential wall 41 of the second casing 40B is inserted into an inner circumference of the lower projecting portion of the second cylindrical portion 62, the engaging claws 44 of the second casing 40B are sequentially brought into engagement with the engaging pieces 68a, 68a of the engaging pieces 68. When the engaging claws 44 are brought into engagement with the upper engaging holes 68a, the second casing 40B is connected airtightly to the cover 60B via a sealing 45 (refer to FIGS. 27 and 28). Distal end portions of the engaging pieces 68 are inserted into the holding frames 46 that are provided on a circumferential wall 41 of the second casing 40B, whereby the distal end portions of the engaging pieces 68 are restricted from expanding diametrically (refer to FIG. 21).

The second partition wall 42 of the second casing 40B is disposed at a lower opening portion of the second cylindrical portion 62, and the second opening 43 is disposed at a center of the second cylindrical portion 62. Thus, as shown in FIG. 25, when looking at the cover 60B from thereabove, the second opening 43 is disposed in another of the apexes of the triangular cover 60B via the second cylindrical portion 62.

Figure 24:
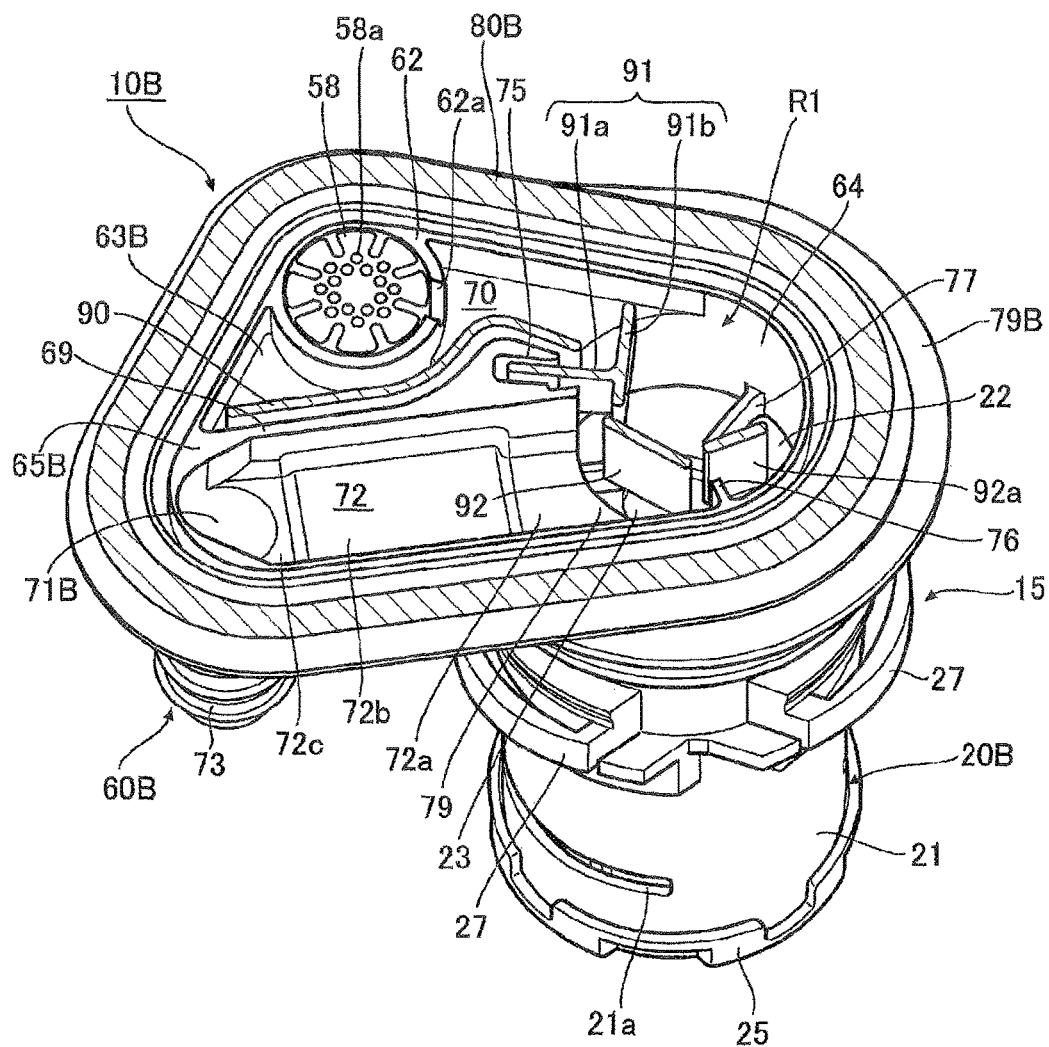
FIG. 24 is a perspective view of the valve device with part of the ceiling wall cut away.

As shown in FIGS. 22A, 24 and 25, a third opening 71B having a circular hole shape is provided in a further apex of the apexes of the triangular shelf wall portion 63B, and this third opening 71B makes up a fuel vapor discharge port. This third opening 71B opens in a direction that is at right angles to the shelf wall portion 63B. As shown in FIG. 25, when looking at the cover 60B from thereabove, the third opening 71B is formed on the shelf wall portion 63B in a position lying spaced away from a recess portion 64 where the first opening 23 is disposed.

As shown in FIGS. 22A, 22B and 26, a piping 73 is provided on a circumferential edge of the third opening 71B a lower surface side of the shelf wall portion 63B so as to extend downwards of the housing 15 therefrom.

Thus, as described above, in the valve device 10B of this embodiment, when looking at the cover 60B that makes up the housing 15 from thereabove, the first opening 23, the second opening 43 and the third opening 71B are disposed respectively in the apexes of the triangular shelf wall portion 63B of the cover 60B (refer to FIG. 25).

As shown in FIG. 25, when looking at the cover 60B from thereabove, a line that connects a center of the first opening 23 and a center of the third opening 71B together is referred to as L1, a line that connects the center of the first opening 23 and a center of the second opening 43 together is referred to as L2, and a line that connects the center of the second opening 43 and the center of the third opening 71B is referred to as L3. In this embodiment, when looking at the cover 60B from thereabove, an angle θ formed by the line L1 and the line L3 is an acute angle. In this embodiment, an angle formed by the line L1 and the line L2 is also an acute angle, and an angle formed by the line L2 and the line L3 is almost a right angle.

As shown in FIGS. 22A, 24 and 25, a first barrier wall 69 is provided in a position along the length of the line L3 that connects the second opening 43 and the third opening 71B together so as to rise from a bottom surface of the ventilation chamber (the upper surface of the shelf wall portion 63B) to a height at which the first barrier wall 69 does not abut the ceiling wall 80B to thereby narrow the gap R3 (refer to FIGS. 26 to 29) in relation to a height-wise direction of the ventilation chamber.

The first barrier wall 69 is formed into a shape in which the first barrier wall 69 is connected to a wall surface of the outer wall 65B that lies between the second cylindrical portion 62 and the third opening 71B at a proximal end portion thereof and extends towards the first opening 23 to reach an inner circumferential edge of the recess portion 64. The first barrier wall 69 is shaped to protrude into a curved surface in a position closer to the recess portion 64 than a middle portion thereof so as to maintain almost a constant space between the second cylindrical portion 62 having the cylindrical shape and itself. A rib groove 75 that is formed into a recessed groove shape is formed at a distal end of the first barrier wall 69 so as to communicate with the recess portion 64 and the gap R3 that makes up the ventilation chamber. When looking at the cover 60B from thereabove, the first barrier wall 69 of this embodiment is formed into the shape of a monkey wrench, however, there is not imposed on specific limitation on the shape thereof, as long as the first barrier wall 69 is disposed anywhere along the length of the line that connects the second opening 43 and the third opening 71B.

Figure 28:
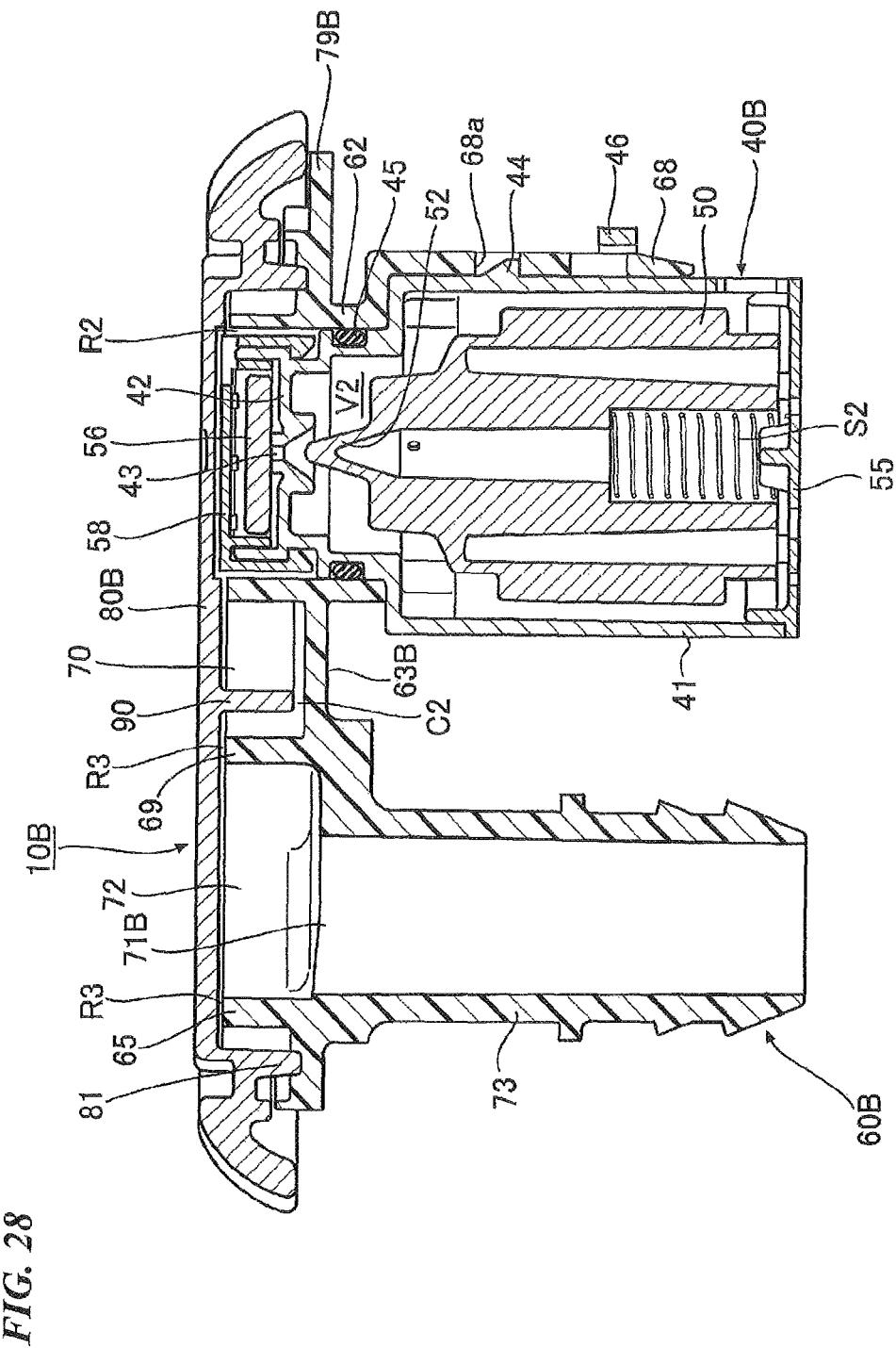
FIG. 28 is a sectional view taken along a line D-D indicated by arrows D in FIG. 6.
Figure 29:
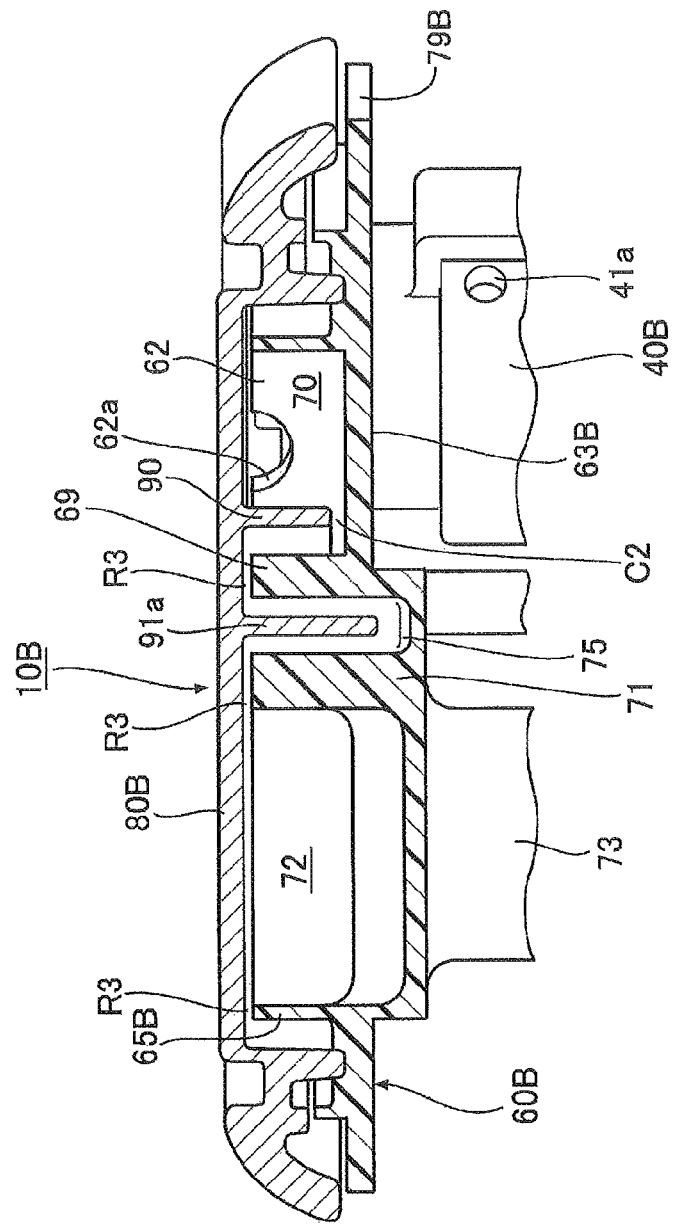
FIG. 29 is a sectional view taken along a line E-E indicated by arrows E in FIG. 6.

As shown in FIGS. 22A, 24 and 25, a first groove portion 70 and a second groove portion 72 are formed between the cover 60B and the ceiling wall 80B so as to be divided by the first barrier wall 69 as a boundary. The first groove portion 70 extends from the second opening 43 so as to communicate with the recess portion 64 and reaches the first opening 23. The second groove portion 72 extends from the first opening 23 so as to reach the third opening 71B and establishes a communication between the recess portion 64 and the third opening 71B. These first groove portion 70 and second groove portion 72 are formed so as to extend generally along the line L2 and the line L1, respectively. As shown in FIGS. 28 and 29, bottom surfaces of the first groove portion 70 and the second groove portion 72 (the upper surface of the shelf wall portion 63B) are formed lower than an upper end face of the first barrier wall 69.

The bottom surface of the second groove portion 72, that is, the upper surface of the portion of the shelf wall portion 63B where the second groove portion 72 includes plural bottom surfaces having different heights. As shown in FIGS. 22A, 24 and 26, the bottom surface of the second groove portion 72 is made up of a first bottom surface 72a that is disposed on a side facing the first opening 23, a second bottom surface 72b that is formed continuously from the first bottom surface 72a on a third opening 71B side and which is raised higher than the first bottom surface 72a, and a third bottom surface 72c that is formed continuously from the second bottom surface 72b and lower than the second bottom surface 72b and where the third opening 71B is provided.

As shown in FIGS. 22B, 25 and 26, an eave wall portion 79 projects from a wall surface of the recess portion 64 as an end portion of the second groove portion 72 at a side of the recess portion 64. This eave wall portion 79 is formed into an arc-shaped rib that is formed in a predetermined width along a circumferential direction of the recess portion 64. As shown in FIGS. 22B, 25 and 26, a pair of vertical ribs 76, 76 are provided at circumferential ends (a length-wise direction) of the eave wall portion 79 so as to project radially inwards of the recess portion 64.

As shown in FIGS. 22A, 22B, 24 and 25, a flange portion 79B is provided on an outer circumference of the ventilation chamber so as to project further radially outwards than the outer wall 65B that is disposed so as to surround the first valve chamber V1 and the second valve chamber V2. As shown in FIG. 22A, the flange portion 79B of this embodiment protrudes radially outwards over a predetermined length from an outer circumferential edge of the annular wall portion 67 that is formed radially outwards of the outer wall 65B.

As shown in FIG. 22B, by providing the flange portion 79B, the first cylindrical portion 61 and the second cylindrical portion 62 can be surrounded by a wall portion 7 indicated by imaginary lines, and hence, the whole of the first casing 20B having the first valve chamber V1 that communicates with the first cylindrical portion 61 and the whole of the second casing 40B having the second valve chamber V2 that communicates with the second cylindrical portion 62 by the wall portion 7.

Figure 20:
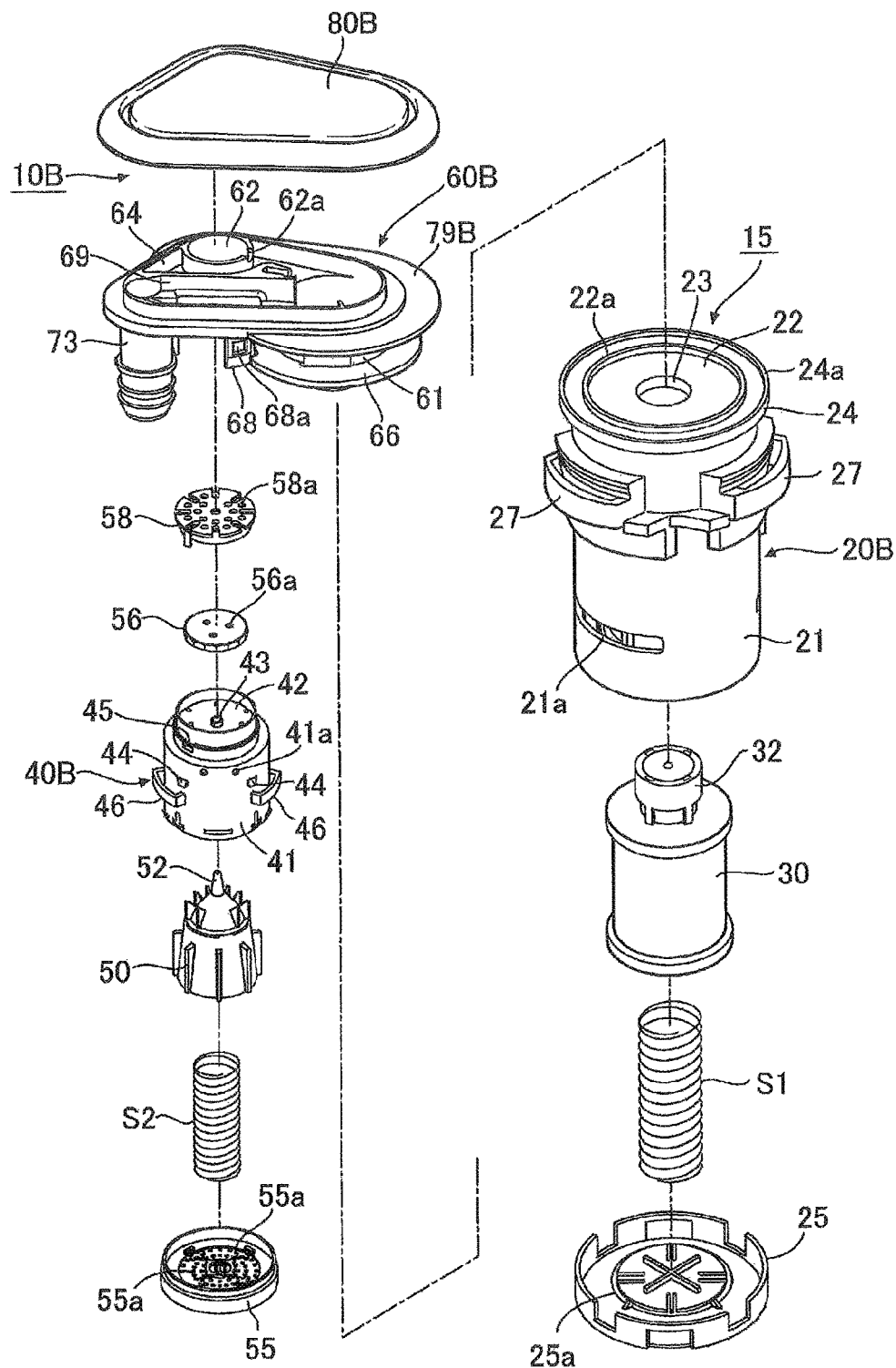
FIG. 20 is an exploded perspective view of a fuel tank valve device according to a further embodiment of the invention.
Figure 21:
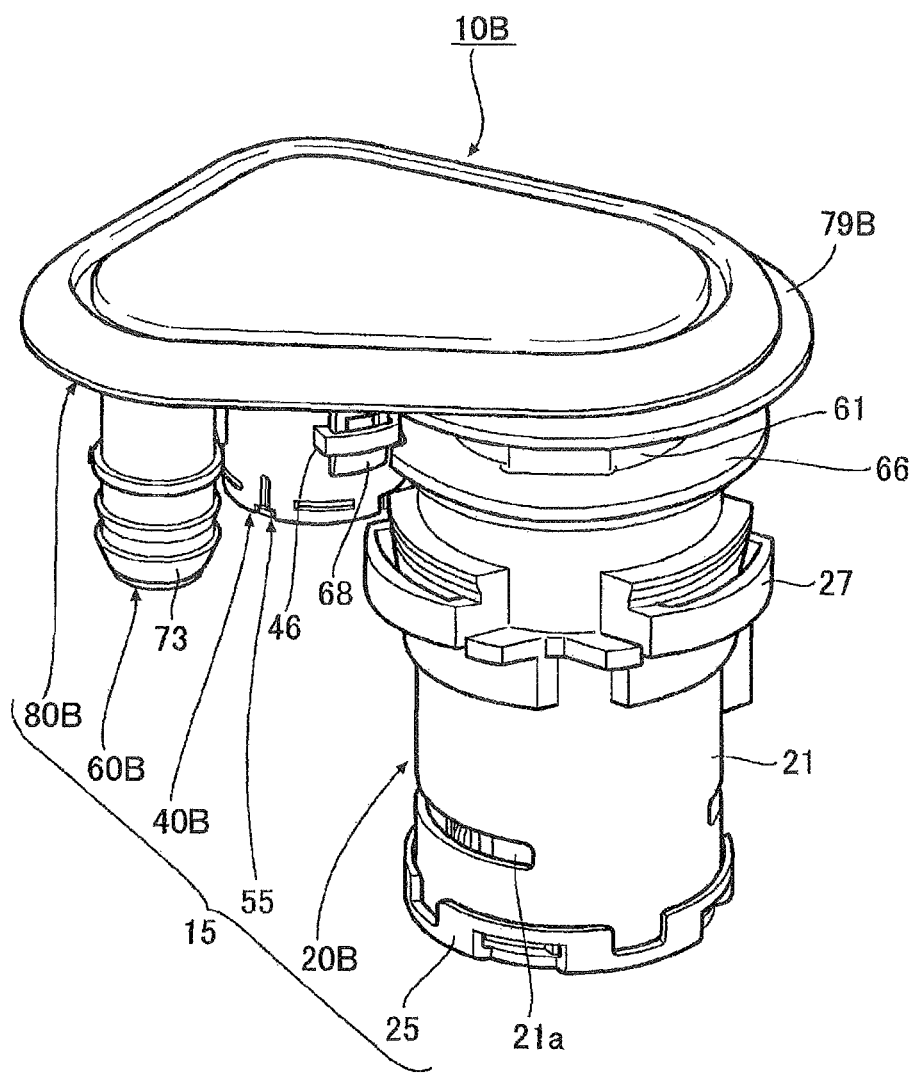
FIG. 21 is a perspective view of the valve device.
Figure 23:
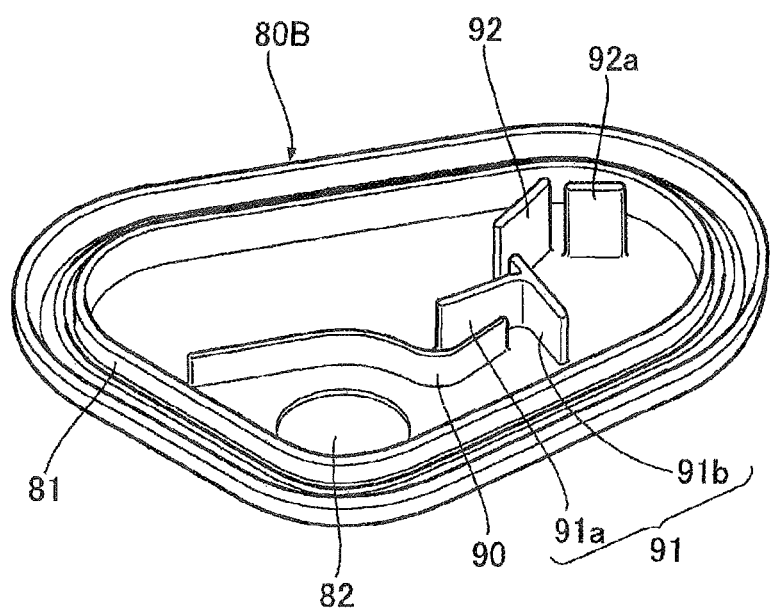
FIG. 23 is a perspective view of a ceiling wall that makes up a housing of the valve device.

As shown in FIGS. 20 and 23, the ceiling wall 80B that is mounted on the cover 60B is formed into a triangle-like plate whose apexes are each rounded into an arc shape so as to match the upper opening portion of the triangle-like cover 60B. An outer circumferential edge of the ceiling wall 80B is shaped so as to be curved moderately downwards.

As shown in FIGS. 23 to 25, a second barrier wall 90 is provided on a ceiling surface of the ventilation chamber, that is, an inner surface of the ceiling wall 80B so as to extend perpendicularly downwards therefrom so as to define a predetermined clear space C2 (refer to FIGS. 27 and 28) between the bottom surface of the ventilation chamber (the upper surface of the shelf wall portion 63B) and itself. The second barrier wall 90 is disposed somewhere along the length of the line L3 that connects the second opening 43 and the third opening 71B together so as to lie adjacent to the first barrier wall 69 that is provided on the shelf wall portion 63B of the cover 60B so as to rise therefrom. This second barrier wall 90 restrains fuel having flown from the second opening 43 into the ventilation chamber from flowing into the third opening 71B.

As shown in FIG. 25, the second barrier wall 90 of this embodiment is disposed, in association with the first barrier wall 69, so that a proximal end portion is disposed close to a wall surface of the outer wall 65B of the cover 60B which lies between the second cylindrical portion 62 and the third opening 71B and extends into a straight line along the first barrier wall 69. A portion of the second barrier wall 90 that lies closer to a distal end than a middle portion is curved moderately towards the second cylindrical portion 62 so as to match the curved protruding portion of the first barrier wall 69 and the outer circumferential surface of the second cylindrical portion 62. A distal end portion is bent back to extend substantially into a straight line towards the recess portion 64 along the line L2 that connects the first opening 23 and the second opening 43 together, so that a distal end of the second barrier wall 90 projects further radially inwards than an inner circumferential edge of the recess portion 64. The second barrier wall 90 is disposed adjacent to the first barrier wall 69 in such a state that a substantially constant gap is maintained therebetween (refer to FIG. 25).

The above-described second barrier wall 90 defines a labyrinth construction like a maze in which the gap R3 and the clear space C2 are disposed alternately at the top and the bottom together with the first barrier wall 69 that is provided on the cover 60B, as shown in FIG. 29.

A guide rib 91 (refer to FIGS. 24 and 26) is provided on the inner surface of the ceiling wall 80B in a position lying adjacent to the second barrier wall 90 so as to extend perpendicularly downwards therefrom. This guide rib 91 guides fuel having entered the ventilation chamber from the second opening 43 to the interior of the recess portion 64.

As shown in FIGS. 23 to 25, this guide rib 91 is disposed so as to overlap the distal end portion of the second barrier wall 90 over a predetermined length and is made up of a first rib 91a that is inserted into a rib inserting groove 75 on the cover 60B and a second rib 91b. This second rib 91b is formed to be substantially at right angles to the first rib 91a and is disposed midway along the length of the line L2 that connects the first opening 23 and the second opening 43 together and further radially inwards into the recess portion than a first opening side opening of the first groove portion 70 so as to cover the opening over a predetermined range. These ribs 91a, 91b are provided so as to rise or extend longer than the first barrier wall 90. As shown in FIG. 29, a U-shaped gap is formed between the first rib 91a and an inner surface of the rib inserting groove 75 at a portion where the first rib 91a is inserted into the rib inserting groove 75. This guide rib 91 provided such that the fuel having entered the first groove portion 70 from the notch 62a in the second cylindrical portion 62 strikes the first rib 91a and the second rib 91b so as to fall easily into the recess portion 64 when the fuel attempts to flow into the recess portion 64.

A flow blocking rib 92 is provided on the inner surface of the ceiling wall 80B (the ceiling surface of the ventilation chamber) so as to extend perpendicularly downwards therefrom. This flow blocking rib 92 restrains the fuel having entered the ventilation chamber from flowing into the third opening 71B. This flow blocking rib 92 extends perpendicularly downwards from the inner surface of the ceiling wall 80B so as to be disposed midway along the length of the line L1 that connects the first opening 23 and the third opening 71B together and further radially inwards into the recess portion than a first opening side opening of the second groove portion 72 so as to cover the opening over a predetermined range. An auxiliary rib 92a is provided on the inner surface of the ceiling wall 80B in a position lying adjacent to the flow blocking rib 92. This auxiliary rib 92a functions in the same way as the flow blocking rib 92 and restrains the fuel having entered the ventilation chamber from flowing into the third opening 71B. These ribs 92, 92a are provided to rise or extend longer than the second barrier wall 90 and the guide rib 91.

Next, the operation and advantageous effect of the valve device 10B of this embodiment will be described.

Even in such a state that the vehicle is inclined so that the recess portion 64 is submerged in fuel, since the third opening 71B that makes up the fuel vapor discharge port is provided in the position on the shelf wall portion 63B that lies spaced away from the recess portion 64, fuel vapors within the fuel tank can be discharged into the third opening 71B through the gap R3 defined between the shelf wall portion 63B and the ceiling wall 80B. This obviates the necessity of providing separately the bypass flow path 78 unlike the valve device 10 of the previous embodiment. Thus, the construction of the valve device 10B can be simplified.

The valve device 10B is mounted wholly in the interior of the fuel tank 1 via mounting brackets 27 provided on the first casing 20B. However, in this embodiment, the first opening 23, the second opening 43 and the third opening 71B that makes up the fuel vapor discharge port are disposed respectively in the apexes of the triangular shelf wall portion 63B (refer to FIG. 25) when looking at the cover 60B that makes up the housing 15 from thereabove. Therefore, compared with the valve device where these openings are aligned on the straight line, the valve device 10B can be formed compact.

By providing the above-described third opening 71B, the piping 73 that connects to a piping connecting to the canister can be provided to extend downwards of the housing 15 from the circumferential edge of the third opening 71B on the lower surface side of the shelf wall portion 63B. Thus, even in the case where the whole of the valve device 10B is set in the interior of the fuel tank 1, the piping connecting to the canister is restricted from interfering with other members such as tubes and pipes that are disposed on an inner wall of the fuel tank 1 or within the fuel tank, thereby enhancing the laying out properties of the valve device 10B.

In this embodiment, when looking at the cover 60B from thereabove, the angle θ formed by the line L1 that connects the first opening 23 and the third opening 71B together and the line L3 that connects the second opening 43 and the third opening 71B together becomes the acute angle. Owing to this, a distance from the first opening 23 to the third opening 71B and a distance from the second opening 43 to the third opening 71B can be ensured long. Thus, the fuel having flown into the ventilation chamber R1 R2 from the through the first opening 23 and the second opening 43 is restrained from entering into the third opening 71B that lies closer to the canister. The piping 73 that extends from the third opening 71B can be formed by a dividable mold that can be slid in a direction that is at right angles to an axial direction of the mold, thereby enhancing the moldability of the housing 15 (here, the moldability of the cover 60B).

In this embodiment, the recess portion 64 in which the first opening 23 is formed in the bottom portion and the second groove portion 72 that communicates with the third opening 71B are formed on the shelf wall portion 63B, and therefore, air and fuel vapors within the fuel tank that flow into the ventilation chamber through the first opening 23 can be discharged into the third opening 71B through the second groove portion 72, and air that flows into the ventilation chamber through the third opening 71B can be caused to flow into the recess portion 64 so as to be taken into the fuel tank from the first opening 23. Thus, air and fuel vapors can be made to flow smoothly within the ventilation chamber, thereby enhancing the gas venting properties of the ventilation chamber.

Figure 30:
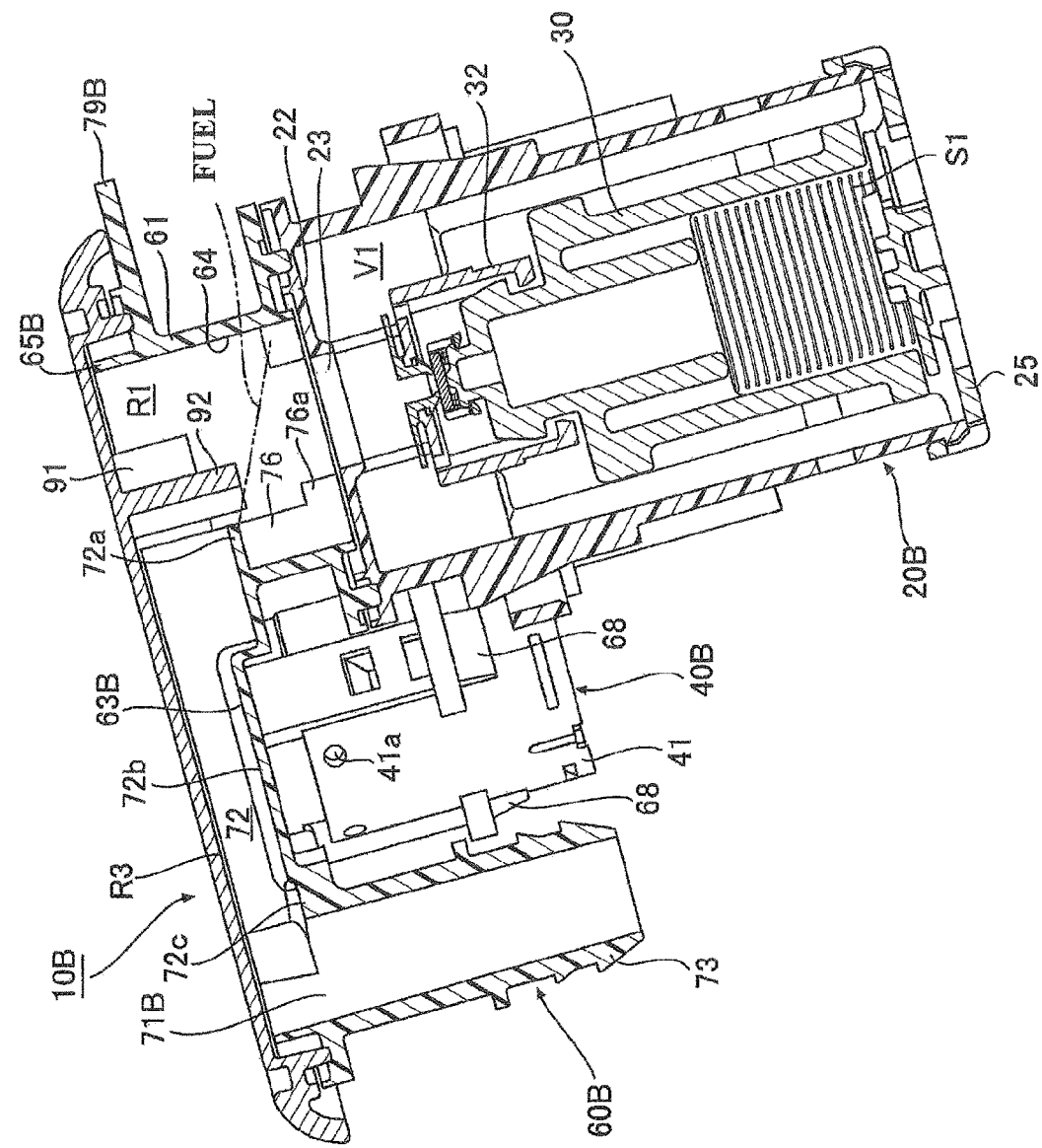
FIG. 30 is a schematic explanatory view of the valve device which is inclined as a result of a vehicle being inclined.

In this embodiment, the eave wall portion 79 extending radially inwards into the recess portion 64 is formed at the recess portion side end portion of the second groove 72 that is formed on the shelf wall portion 63B. Therefore, as shown in FIG. 30, the fuel having entered the interior of the recess portion 64 from the first opening 23 can be held back within the recess portion 64, thereby restraining the fuel in the recess portion 64 from flowing into the third opening 71B when the vehicle is inclined.

In this embodiment, the vertical ribs 76, 76 are provided at the longitudinal ends of the eave wall portion 79 so as to project radially inwards into the recess portion 64. Thus, when the vehicle is inclined, the fuel having flown from the first opening 23 into the recess portion 64 can be restrained from flowing out of the recess portion 64 by flowing around the eave wall portion 79 to thereby hold the fuel back stably within the recess portion 64, thereby restraining the fuel from flowing into the third opening 71B.

DESCRIPTION OF REFERENCE NUMERALS AND SIGNS

1 Fuel tank
10A, 10B, 10C Fuel tank valve device (Valve device)

15 Housing
20, 20B First casing
22 First partition wall
23 First opening
30 First float valve
40, 40B Second casing
42 Second partition wall
43 Second opening
50 Second float valve
60, 60A, 60B Cover
63, 63B Shelf wall portion
64 Recess portion
70 First groove portion
71 Fuel vapor discharge port (Discharge port)
71B Third opening
73 Fuel vapor piping (piping)
76 Vertical rib
79 Eave wall portion
80, 80A, 80B Ceiling wall
83 Rib
R1 First ventilation chamber
R2 Second ventilation chamber
R3 Gap
V1 First valve chamber
V2 Second valve chamber

The invention claimed is:

1. A fuel tank valve device, comprising:
   a housing in which a partition wall defines a lower valve chamber and an upper ventilation chamber, and a first opening and a second opening are provided to establish a communication between the lower valve chamber and the upper ventilation chamber;
   a first float valve that is accommodated in a first valve chamber of the lower valve chamber so as to rise and fall and that closes the first opening when a fuel level in a fuel tank nearly reaches a set full fuel level;
   a second float valve that is accommodated in a second valve chamber of the lower valve chamber so as to rise and fall and that closes the second opening when the fuel level in the fuel tank rises abnormally;
   a recess portion in which the first opening of the housing is formed at a bottom portion of the recess portion and which makes up a part of the upper ventilation chamber; and
   a fuel vapor discharge port that is formed so as to communicate with the upper ventilation chamber,
   wherein the partition wall includes a shelf wall portion that extends to the recess portion,
   wherein a first groove portion is formed on the shelf wall portion so as to extend to the recess portion,
   wherein a ceiling wall that makes up a ceiling of the upper ventilation chamber is disposed above the shelf wall portion via a gap,
   wherein a third opening that makes up the fuel vapor discharge port is provided on the shelf wall portion at a position that lies spaced away from the recess portion when the housing is seen from thereabove,
   wherein a second groove portion is formed on the partition wall so as to extend to establish a communication between the recess portion and the third opening, and
   wherein the first opening, the second opening, and the third opening are disposed respectively at apexes of a triangle when the housing is seen from thereabove.

2. The fuel tank valve device of claim 1, wherein a line that connects the first opening and the third opening, and a line that connects the second opening and the third opening form an acute angle when the housing is seen from thereabove.

3. The fuel tank valve device of claim 1, wherein an eave wall portion is formed on an end portion of the second groove portion at a side of the recess portion so as to project radially inwards of the recess portion.

4. The fuel tank valve device of claim 3, wherein vertical ribs are provided near a longitudinal end of the cave wall portion so as to project radially inwards of the recess portion.

5. The fuel tank valve device of claim 1, wherein a depth of the first groove portion from an upper surface of the shelf wall portion is greater than a height of the gap defined between the shelf wall portion and the ceiling wall.

6. The fuel tank valve device of claim 1, wherein an area of the first groove portion when the first groove portion is cut along a plane that is perpendicular to an extending direction of the first groove portion is greater than an area of the second opening.

7. The fuel tank valve device of claim 1, wherein, in a plan view, a line that connects the first opening and the third opening, and a line that connects the second opening and the third opening form an acute angle of the triangle.

8. The fuel tank valve device of claim 1, wherein the housing includes a main body portion in which at least one of the lower valve chamber, the upper ventilation chamber, the partition wall, the recess portion, and the fuel vapor discharge port is provided, and
   wherein the ceiling wall is mounted on the main body portion.

9. The fuel tank valve device of claim 1, wherein the fuel vapor discharge port is formed on an inner circumference of the recess portion at a different circumferential position from a circumferential position of the first groove portion.

10. The fuel tank valve device of claim 9, further comprising:
    a fuel vapor piping that communicates with the fuel vapor discharge port and which is connected to the housing at an acute angle relative to a path extending from the second opening to the first opening.

11. A fuel tank valve device, comprising:
    a housing in which a partition wall defines a lower valve chamber and an upper ventilation chamber, and a first opening and a second opening are provided to establish a communication between the lower valve chamber and the upper ventilation chamber;
    a first float valve that is accommodated in a first valve chamber of the lower valve chamber so as to rise and fall and that closes the first opening when a fuel level in a fuel tank nearly reaches a set full fuel level;
    a second float valve that is accommodated in a second valve chamber of the lower valve chamber so as to rise and fall and that closes the second opening when the fuel level in the fuel tank rises abnormally;
    a recess portion in which the first opening of the housing is formed at a bottom portion of the recess portion and which makes up a part of the upper ventilation chamber; and
    a fuel vapor discharge port that is formed so as to communicate with the upper ventilation chamber,
    wherein the partition wall includes a shelf wall portion that extends to the recess portion,
    wherein a first groove portion is formed on the shelf wall portion so as to extend to the recess portion, wherein a ceiling wall that makes up a ceiling of the upper ventilation chamber is disposed above the shelf wall portion via a gap, wherein the fuel vapor discharge port is formed on an inner circumference of the recess portion at a different circumferential position from a circumferential position of the first groove portion, wherein there is further provided a fuel vapor piping that communicates with the fuel vapor discharge port and which is connected to the housing at an acute angle relative to a path extending from the second opening to the first opening, and wherein a bypass flow path is provided in the housing so as to be opened in the shelf wall portion to thereby communicate with the gap at one end and to be opened in an inner circumference of the fuel vapor piping to thereby communicate with the fuel vapor piping at an other end of the bypass flow path.

12. The fuel tank valve device of claim 11, wherein the fuel vapor piping is provided so that at least a part of the fuel vapor piping passes below the shelf wall portion of the partition wall.

13. The fuel tank valve device of claim 11, wherein the bypass flow path extends downwards in a perpendicular direction from an upper surface of the shelf wall portion of the partition wall to communicate with the inner circumference of the fuel vapor piping at a lower end.

14. The fuel tank valve device of claim 11, wherein a rib is turned on an inner surface of the ceiling wall to pass between the first groove portion and the bypass flow path and to extend in a direction of moving away from the fuel vapor discharge port.

15. A fuel tank valve device, comprising:

a housing in which a partition wall defines a lower valve chamber and an upper ventilation chamber, and a first opening, and a second opening are provided to establish a communication between the lower valve chamber and the upper ventilation chamber;

a first float valve that is accommodated in a first valve chamber of the lower valve chamber so as to rise and fall and that closes, the first opening when a fuel level in a fuel tank nearly reaches a set full fuel level;

a second float valve that is accommodated in a second valve chamber of the lower valve chamber so as to rise and fall and that closes the second opening when the fuel level in the fuel tank rises abnormally;

a recess portion in which the first opening of the housing is formed at a bottom portion of the recess portion and which makes up a part of the upper ventilation chamber; and a fuel vapor discharge port that is formed so as to communicate with the upper ventilation chamber, wherein the partition wall includes a shelf wall portion that extends to the recess portion, wherein a first groove portion is formed on the shelf wall portion so as to extend to the recess portion, wherein a ceiling wall that makes up a ceiling of the upper ventilation chamber is disposed above the shelf wall portion via a gap, wherein a third opening that makes up the fuel vapor discharge port is provided on the shelf wall portion at a position that lies spaced away from the recess portion when the housing is seen from thereabove, wherein a second groove portion is formed on the partition wall so as to extend to establish a communication between the recess portion and the third opening;

wherein the housing includes a main body portion in which the lower valve chamber, the upper ventilation chamber, the partition wall, the recess portion, and the fuel vapor discharge port are provided, and wherein the ceiling wall as a separate me r is mounted on the main body portion.

* * * * *